United States Patent
Choi et al.

(10) Patent No.: US 11,349,616 B2
(45) Date of Patent: May 31, 2022

(54) SRS TRANSMISSION METHOD FOR UPLINK BEAM CORRECTION, AND TERMINAL THEREFOR

(71) Applicant: LG Electronics Inc., Seoul (KR)

(72) Inventors: Kukheon Choi, Seoul (KR); Jiwon Kang, Seoul (KR); Kijun Kim, Seoul (KR); Kyuseok Kim, Seoul (KR); Minki Ahn, Seoul (KR); Kilborn Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 188 days.

(21) Appl. No.: 16/475,603

(22) PCT Filed: Dec. 26, 2017

(86) PCT No.: PCT/KR2017/015454
§ 371 (c)(1),
(2) Date: Jul. 2, 2019

(87) PCT Pub. No.: WO2018/124685
PCT Pub. Date: Jul. 5, 2018

(65) Prior Publication Data
US 2021/0135808 A1    May 6, 2021

Related U.S. Application Data

(60) Provisional application No. 62/441,445, filed on Jan. 2, 2017.

(51) Int. Cl.
*H04L 5/00* (2006.01)
*H04B 7/06* (2006.01)
*H04W 72/04* (2009.01)

(52) U.S. Cl.
CPC ......... *H04L 5/0048* (2013.01); *H04B 7/0695* (2013.01); *H04L 5/0053* (2013.01); *H04W 72/0413* (2013.01)

(58) Field of Classification Search
CPC ... H04L 5/0048; H04L 5/0053; H04B 7/0695; H04W 72/0413
See application file for complete search history.

(56) References Cited

U.S. PATENT DOCUMENTS

2011/0268028 A1    11/2011   Stern-Berkowitz et al.
2013/0322280 A1*   12/2013   Pi ................... H04W 56/0005
                                                      370/252

(Continued)

FOREIGN PATENT DOCUMENTS

CN    101771463       7/2010
WO    WO2018097680    5/2018

OTHER PUBLICATIONS

Extended European Search Report in European Application No. 17888188.4, dated Jul. 27, 2020, 14 pages.

(Continued)

*Primary Examiner* — Duc C Ho
(74) *Attorney, Agent, or Firm* — Fish & Richardson P.C.

(57) ABSTRACT

A method by which a terminal transmits an SRS comprises the steps of: receiving, from a base station, control information indicating a transmission request of SRS in a plurality of slots or subframes; and transmitting SRSs in the plurality of slots or subframes on the basis of the control information, wherein the control information can be received when the total number of uplink transmission beams or the number of ports for SRS transmission exceeds the maximum number of SRS beams, which can be transmitted in one slot or one subframe, or the number of ports for SRS transmission.

15 Claims, 28 Drawing Sheets

(56) References Cited

U.S. PATENT DOCUMENTS

| | | | | |
|---|---|---|---|---|
| 2013/0344881 | A1* | 12/2013 | Nakasato | H04W 72/04 |
| | | | | 455/450 |
| 2014/0241242 | A1 | 8/2014 | Josiam et al. | |
| 2017/0302414 | A1* | 10/2017 | Islam | H04W 72/046 |
| 2018/0310283 | A1* | 10/2018 | Deenoo | H04L 5/0048 |
| 2019/0081751 | A1* | 3/2019 | Miao | H04B 7/024 |
| 2020/0145079 | A1* | 5/2020 | Marinier | H04B 7/0456 |

OTHER PUBLICATIONS

Huawei, HiSilicon, "Reference Signal design for UL based measurement, CSI acquisition, and beam Management," R1-1609413, 3GPP TSG RAN WG1 Meeting #86bis, Lisbon, Portugal, dated Oct. 10-14, 2016, 4 pages, XP051149456.

Nokia, Alcatel-Lucent Shanghai Bell, Verizon Wireless, "Frame Structure Support for Beam Based Common Control Plane," R1-167265, 3GPP TSG-RAN WG1#86, Gothenburg, Sweden, dated Aug. 22-26, 2016, 5 pages, XP051125799.

Huawei, HiSilicon, "UL SRS Design for CSI Acquisition and Beam Management," R1-1611678, 3GPP TSG RAN WG1 Meeting #87, Reno, USA, Nov. 14-18, 2016, 5 pages.

Qualcomm Incorporated, "Views on SRS," R1-1612049, 3GPP TSG-RAN WG1 #87, Reno, Nevada, USA, Nov. 14-18, 2016, 4 pages.

Nokia, Alcatel-Lucent Shanghai Bell, "UL SRS design considerations in NR," R1-1612861, 3GPP TSG-RAN WG1 Meeting #87, Reno, USA, Nov. 14-18, 2016, 5 pages.

LG Electronics, "Considerations on NR SRS design," R1-1611808, 3GPP TSG RAN WG1 Meeting #87, Reno, USA, Nov. 14-18, 2016, 6 pages.

PCT International Search Report and Written Opinion in International Application No. PCT/KR2017/015454, dated Apr. 12, 2018, 18 pages (with English translation).

Huawei & HiSilicon, "Reference Signal design for UL based measurement, CSI acquisition, and beam management," R1-1609413, Presented at 3GPP TSG RAN WG1 Meeting #86bis, Lisbon, Portugal, Oct. 10-14, 2016, 4 pages.

Nokia et al., "Frame Structure Support for Beam Based Common Control Plane," R1-167265, Presented at 3GPP TSG-RAN WG1#86, Gothenburg, Sweden, Aug. 22-26, 2016, 5 pages.

Office Action in Chinese Appln. No. 201780081901.X, dated Aug. 10, 2021, 10 pages (with English translation).

* cited by examiner

FIG. 7a
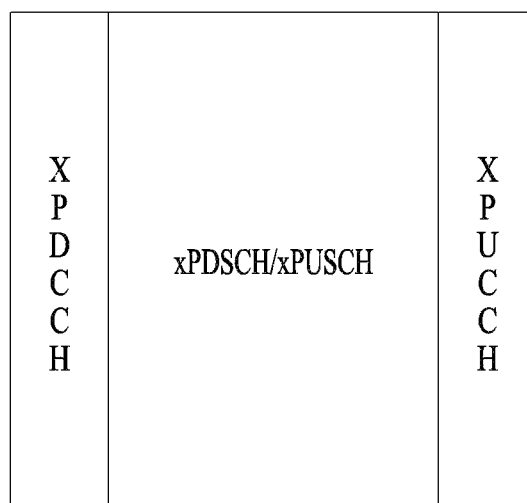
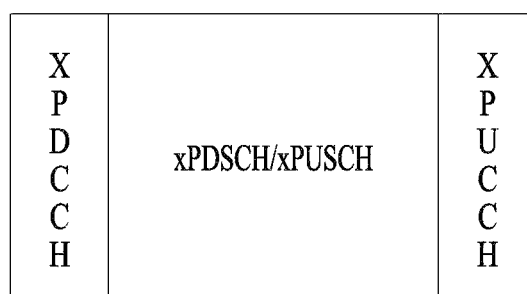
default self contained subframe structure

FIG. 7c
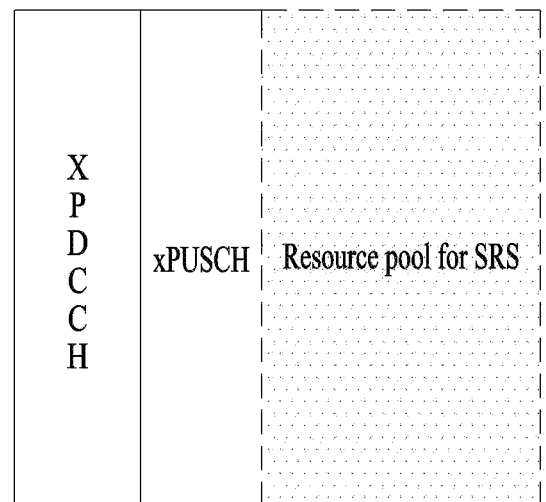
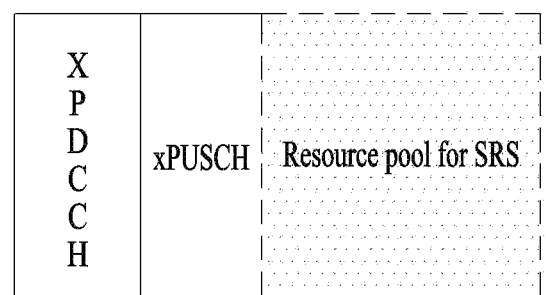
Resource Pool for SRS
(subframe configured without xPUCCH)

FIG. 8
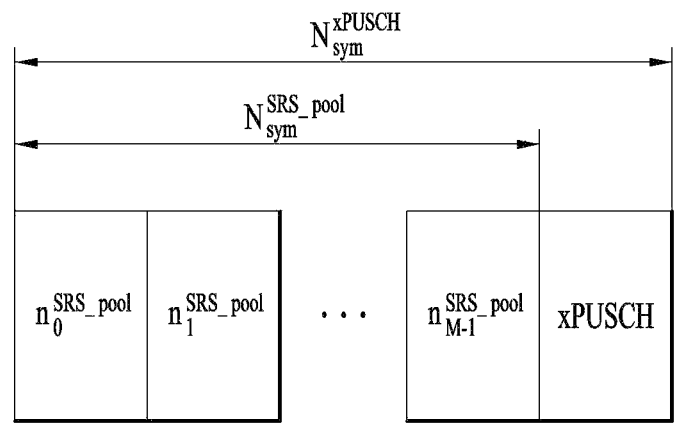
ascending configuration example
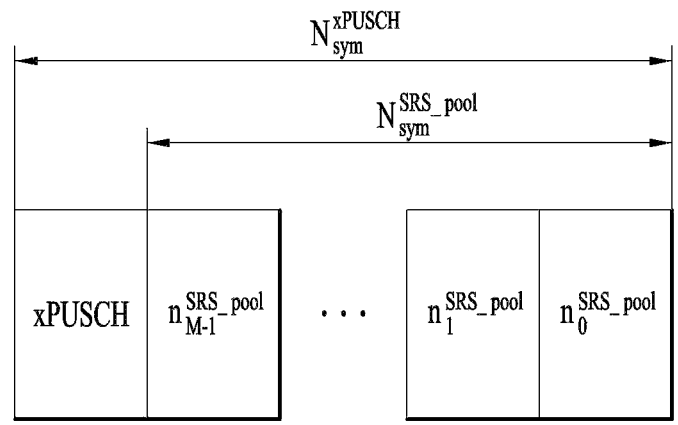
descending configuration example SRS pool signalling example example of SRS resource in SRS pool according to SRS resource UE specific tracking trigger Alt 1-1 example Alt 1-2 example Alt 1-3 example

FIG. 23
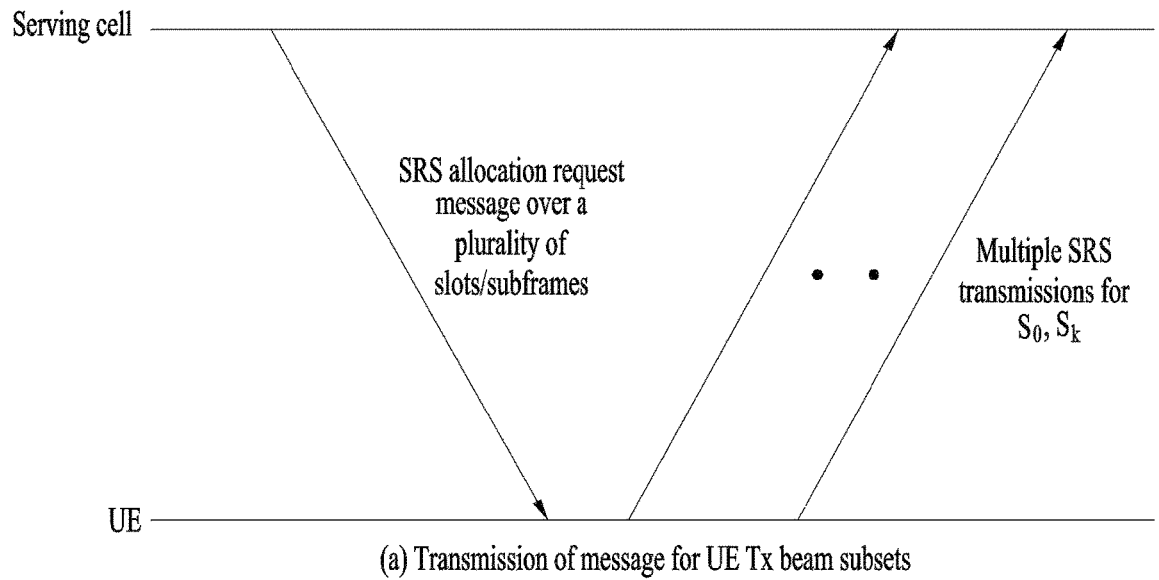
(a) Transmission of message for UE Tx beam subsets
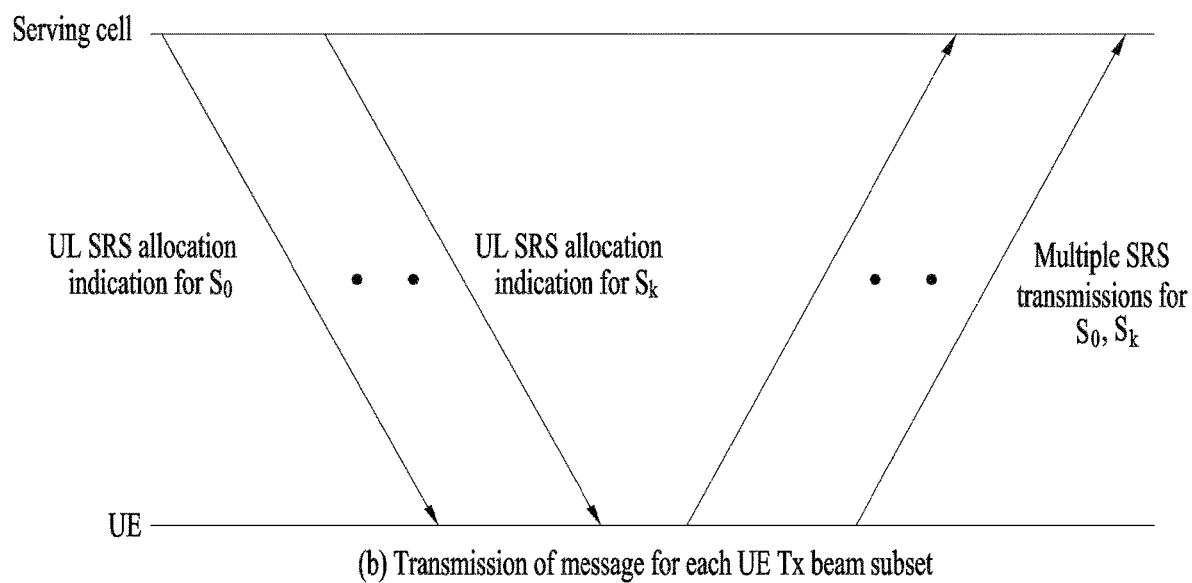
(b) Transmission of message for each UE Tx beam subset FIG. 25
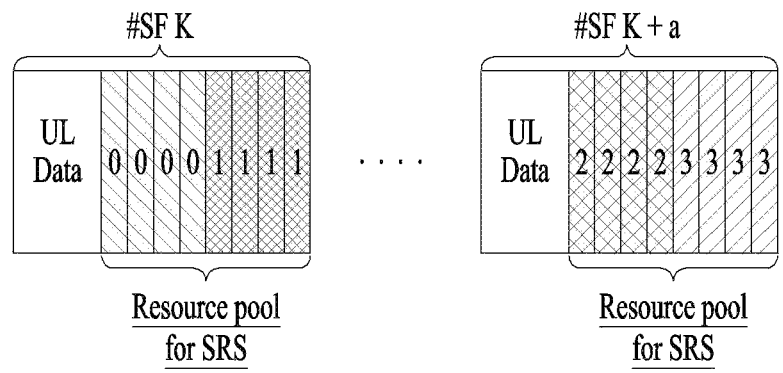
(a) Example of repetitive mapping transmission on a per symbol basis
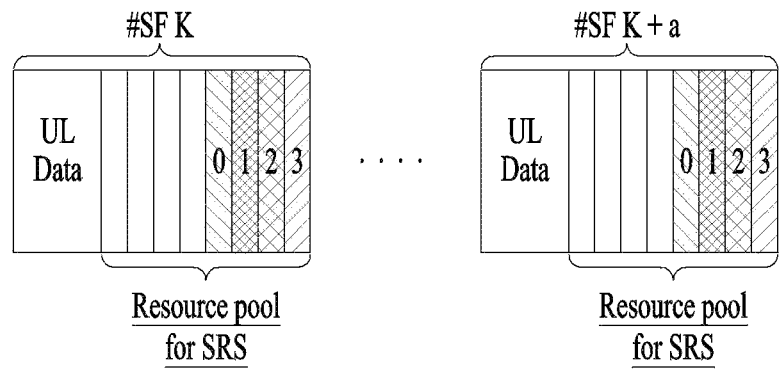
(b) Example of UE Tx beam mapping for the number of beam order repetitions
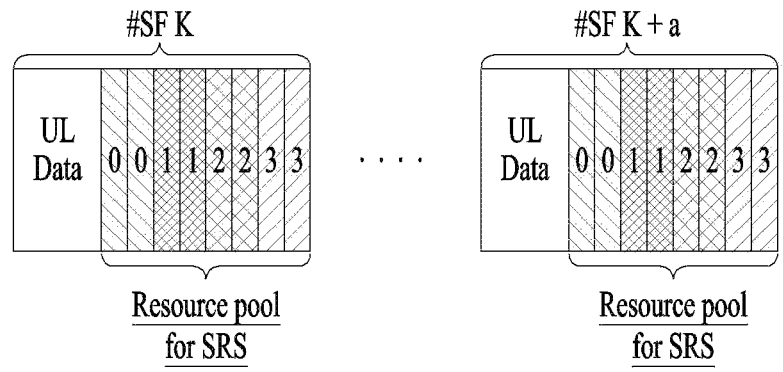
(c) Example of combined type mapping

SRS TRANSMISSION METHOD FOR UPLINK BEAM CORRECTION, AND TERMINAL THEREFOR

CROSS-REFERENCE TO RELATED APPLICATIONS

This application is a National Stage application under 35 U.S.C. § 371 of International Application No. PCT/KR2017/015454, filed on Dec. 26, 2017, which claims the benefit of U.S. Provisional Application No. 62/441,445, filed on Jan. 2, 2017. The disclosures of the prior applications are incorporated by reference in their entirety.

TECHNICAL FIELD

The present disclosure relates to wireless communication, and more particularly, to an SRS transmission method for uplink beam sweeping/refinement and a terminal therefor

BACKGROUND ART

The beam scanning procedure has a large processing overhead, and accordingly beam scanning cannot have an extremely short periodicity. Channels over 6 GHz are very likely to change more rapidly over time than the existing channels below 6 GHz due to the additional channel elements mentioned above. Further, in the cellular system, the BS beam configuration may be fixed, but the beam of a terminal may be changed according to the location of a serving cell, the surroundings, the terminal behavior pattern, and the like. That is, there is a high possibility that Tx/Rx beam mismatch will occur in a beam scanning section. Therefore, a beam tracking technique is needed to overcome this issue.

DISCLOSURE OF THE INVENTION

Technical Task

An object of the present disclosure is to provide a method for transmitting an SRS by a terminal.

Another object of the present disclosure is to provide a terminal for transmitting an SRS.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In one aspect of the present disclosure, provided herein is a method for transmitting a sounding reference symbol (SRS) by a user equipment (UE), the method including receiving, from a base station, control information indicating a SRS transmission request in a plurality of slots or subframes, and transmitting SRSs in the plurality of slots or subframes based on the control information, wherein the control information may be received when a total number of uplink transmission beams exceeds the maximum number of SRS beams transmittable in one slot or one subframe or the number of ports for SRS transmission exceeds the maximum number of ports for the SRS transmission in one slot or one subframe.

The control information may further include uplink transmission beam information for transmitting the SRSs in the plurality of slots or subframes, wherein the UE may transmit the SRSs using uplink transmission beams included in the uplink transmission beam information. The control information may be for uplink beam refinement or uplink beam sweeping. The control information may further include information on the number of the plurality of slots or subframes, the number of uplink transmission beams, or the number of ports for the SRS transmission. The total number of the uplink beams may be determined based on the number of radio frequency (RF) chains of the UE, and the indication may be for uplink beam refinement or uplink beam sweeping.

In another aspect of the present disclosure, provided herein is a method for transmitting a sounding reference symbol (SRS) by a user equipment (UE), the method including transmitting, to a base station, a message indicating a SRS transmission request in a plurality of slots or subframes when a total number of uplink transmission beams exceeds a maximum number of SRS beams transmittable in one slot or one subframe or the number of ports for SRS transmission exceeds a maximum number of ports for the SRS transmission in one slot or one subframe, receiving information on a mapping method of SRSs on the plurality of slots or subframes from the base station, mapping the SRSs onto the plurality of slots or subframes according to the mapping method, and transmitting the mapped SRSs to the base station.

The message may further include information on the number of the plurality of slots or subframes, the number of uplink transmission beams, the number of uplink transmission beam subsets, the number of ports for the SRS transmission, or the number of port subsets for the SRS transmission.

The message may include a field indicating whether the message is a scheduling request (SR) for uplink data or a request for uplink beam refinement, wherein an SRS transmission request of the message may be indicated by requesting the uplink beam refinement.

The message may be transmitted through format 1 of a physical uplink control channel (PUCCH). The message may be transmitted by being piggybacked on a physical uplink shared channel (PUSCH).

In another aspect of the present disclosure, provided herein is a user equipment (UE) for transmitting a sounding reference symbol (SRS), including a receiver, a transmitter, and a processor, wherein the processor may control the receiver to receive, from a base station, control information indicating a SRS transmission request in a plurality of slots or subframes and control the transmitter to transmit SRSs in the plurality of slots or subframes based on the control information, wherein the receiver may receive the control information when a total number of uplink transmission beams exceeds the maximum number of SRS beams transmittable in one slot or one subframe or the number of ports for SRS transmission exceeds the maximum number of ports for the SRS transmission in one slot or one subframe.

The control information may further include uplink transmission beam information for transmitting the SRSs in the plurality of slots or subframes, wherein the processor may control the transmitter to transmit the SRSs using uplink transmission beams included in the uplink transmission beam information.

In another aspect of the present disclosure, provided herein is a user equipment (UE) for transmitting a sounding reference symbol (SRS), including a receiver, a transmitter, and a processor, wherein the processor controls the transmitter to transmit, to a base station, a message indicating a SRS transmission request in a plurality of slots or subframes when a total number of uplink transmission beams exceeds the maximum number of SRS beams transmittable in one slot or one subframe or the number of ports for SRS transmission exceeds a maximum number of ports for the SRS transmission in one slot or one subframe, and controls the receiver to receive information on a mapping method of SRSs on the plurality of slots or subframes from the base station, wherein the processor may be configured to map the SRSs onto the plurality of slots or subframes according to the mapping method, and wherein the processor may control the transmitter to transmit the mapped SRSs to the base station.

The message may further include information on the number of the plurality of slots or subframes, the number of uplink transmission beams, the number of uplink transmission beam subsets, the number of ports for the SRS transmission, or the number of port subsets for the SRS transmission. The message may be transmitted in format 1 of a physical uplink control channel (PUCCH) or by being piggybacked on a physical uplink shared channel (PUSCH).

Advantageous Effects

There may be a case where an SRS transmission pool in an SRS subframe may be insufficient as resources required for transmission in comparison with the total number of candidate beams of a user equipment (UE) for uplink beam refinement. To prevent this case, multiple SRS subframes may be allowed to be used, or SRS resources divided according to the UE Tx beam capability or UE Tx port capability within one SRS subframe may be used to enable transmission according to all candidate beams or ports.

The effects that can be achieved through the embodiments of the present disclosure are not limited to what has been particularly described hereinabove and other effects which are not described herein can be derived by those skilled in the art from the following detailed description.

DESCRIPTION OF DRAWINGS

The accompanying drawings, which are included to provide a further understanding of this disclosure and are incorporated in and constitute a part of this specification, illustrate embodiments of this disclosure.

FIG. 8 is a diagram illustrating SRS transmission symbol indices (configured in ascending and descending order) in an SRS resource pool.

FIG. 23 is a diagram illustrating a message transmission method for a UE Tx beam subset over a plurality of slots/subframes.

FIG. 25 is a diagram illustrating an example of beam mapping for long term beam measurement.

MODE FOR INVENTION

Figure 1:
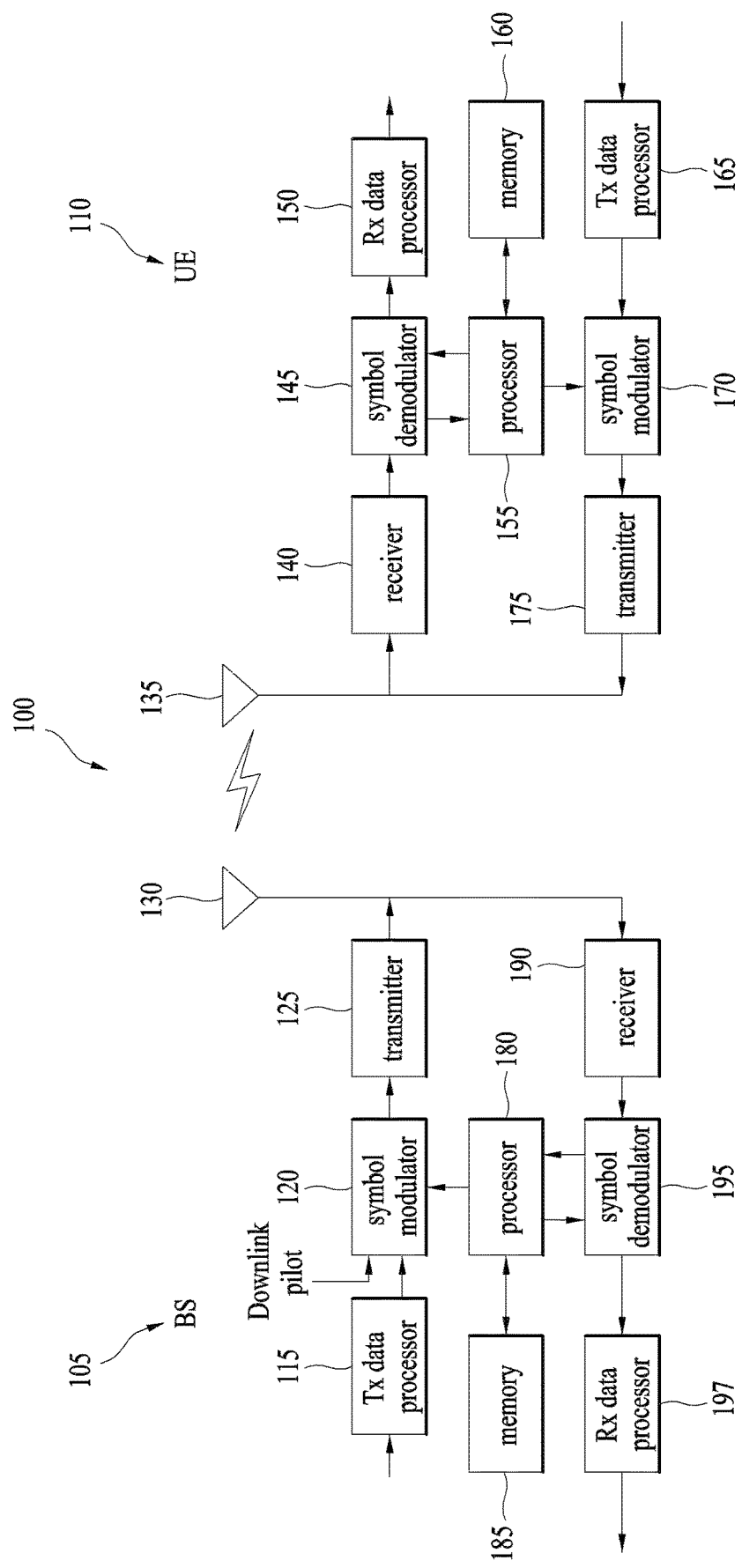
FIG. 1 is a block diagram for configurations of a base station 105 and a user equipment 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a terminal or a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

Moreover, in the following description, specific terms are provided to help the understanding of the present disclosure. And, the use of the specific terminology can be modified into another form within the scope of the technical idea of the present disclosure.

FIG. 1 is a block diagram for configurations of a base station 105 and a user equipment 110 in a wireless communication system 100.

Although one base station 105 and one user equipment 110 are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

For UE Tx beam tracking, a UE needs to transmit an SRS for each candidate Tx beam of the UE. However, if SRSs are transmitted toward many beam directions (in accordance with a UE's Tx beam set for all directions), it may result in significant resource waste. Accordingly, the present disclosure proposes a method of performing an adaptive UE Tx beam tracking by performing SRS transmission flexibly according to UE pattern changes.

First, Table 1 below shows details of SRS transmission in the 3GPP LTE/LTE-A system.

TABLE 1

A UE shall transmit Sounding Reference Symbol (SRS) on per serving cell SRS resources based on two trigger types:
trigger type 0: higher layer signalling
trigger type 1: DCI formats 0/4/1A for FDD and TDD and DCI formats 2B/2C/2D for TDD.
In case both trigger type 0 and trigger type 1 SRS transmissions would occur in the same subframe in the same serving cell, the UE shall only transmit the trigger type 1 SRS transmission.
A UE may be configured with SRS parameters for trigger type 0 and trigger type 1 on each serving cell. The following SRS parameters are serving cell specific and semi-statically configurable by higher layers for trigger type 0 and for trigger type 1.
Transmission comb $\bar{k}_{TC}$, as defined in subclause 5.5.3.2 of [3] for trigger type 0 and each configuration of trigger type 1
Starting physical resource block assignment $n_{RRC}$, as defined in subclause 5.5.3.2 of [3] for trigger type 0 and each configuration of trigger type 1
duration: single or indefinite (until disabled), as defined in [11] for trigger type 0
srs-ConfigIndex $I_{SRS}$ for SRS periodicity $T_{SRS}$ and SRS subframe offset $T_{offset}$, as defined in Table 8.2-1 and Table 8.2-2 for trigger type 0 and SRS periodicity $T_{SRS, 1}$, and SRS subframe offset $T_{SRS, 1}$, as defined in Table 8.2-4 and Table 8.2-5 trigger type 1
SRS bandwidth $B_{SRS}$, as defined in subclause 5.5.3.2 of [3] for trigger type 0 and each configuration of trigger type 1
Frequency hopping bandwidth, $b_{hop}$, as defined in subclause 5.5.3.2 of [3] for trigger type 0
Cyclic shift $n_{SRS}^{cs}$, as defined in subclause 5.5.3.1 of [3] for trigger type 0 and each configuration of trigger type 1
Number of antenna ports $N_p$ for trigger type 0 and each configuration of trigger type 1
For trigger type 1 and DCI format 4 three sets of SRS parameters, srs-ConfigApDCI-Format4, are configured by higher layer signalling. The 2-bit SRS request field [4] in DCI format 4 indicates the SRS parameter set given in Table 8.1-1. For trigger type 1 and DCI format 0, a single set of SRS parameters, srs-ConfigApDCI-Format0, is configured by higher layer signalling. For trigger type 1 and DCI formats 1A/2B/2C/2D, a single common set of SRS parameters, srs-ConfigApDCI-Format1a2b2c, is configured by higher layer signalling. The SRS request field is 1 bit [4] for DCI formats 0/1A/2B/2C/2D, with a type 1 SRS triggered if the value of the SRS request field is set to '1'.
A 1-bit SRS request field shall be included in DCI formats 0/1A for frame structure type 1 and 0/1A/2B/2C/2D for frame structure type 2 if the UE is configured with SRS parameters for DCI formats 0/1A/2B/2C/2D by higher-layer signalling.

Table 2 below shows SRS request values for trigger type 1 of DCI format 4 in the 3GPP LTE/LTE-A system.

TABLE 2

| Value of SRS request field | Description |
| --- | --- |
| '00' | No type 1 SRS trigger |
| '01' | The $1^{st}$ SRS parameter set configured by higher layers |
| '10' | The $2^{nd}$ SRS parameter set configured by higher layers |
| '11' | The $3^{rd}$ SRS parameter set configured by higher layers |

Table 3 below shows additional details of the SRS transmission in the 3GPP LTE/LTE-A system.

TABLE 3

The serving cell specific SRS transmission bandwidths $C_{SRS}$ are configured by higher layers. The allowable values are given in subclause 5.5.3.2 of [3].
The serving cell specific SRS transmission sub-frames are configured by higher layers. The allowable values are given in subclause 5.5.3.3 of [3].

TABLE 3-continued

For a TDD serving cell, SRS transmissions can occur in UpPTS and uplink subframes of the UL/DL configuration indicated by the higher layer parameter subframeAssignment for the serving cell.

When closed-loop UE transmit antenna selection is enabled for a given serving cell for a UE that supports transmit antenna selection, the index $a(n_{SRS})$, of the UE antenna that transmits the SRS at time $n_{SRS}$ is given by
$a(n_{SRS}) = n_{SRS}$ mod 2, for both partial and full sounding bandwidth, and when frequency hopping is disabled (i.e., $b_{hop} \geq B_{SRS}$), $$a(n_{SRS}) = \begin{cases} (n_{SRS} + \lfloor n_{SRS}/2 \rfloor + \beta \cdot \lfloor n_{SRS}/K \rfloor) \bmod 2 & \text{when K is even} \\ n_{SRS} \bmod 2 & \text{when K is odd} \end{cases},$$

$$\beta = \begin{cases} 1 & \text{where K mod 4 = 0} \\ 0 & \text{otherwise} \end{cases}$$

when frequency hopping is enabled (i.e. $b_{hop} < B_{SRS}$),
where values $B_{SRS}$, $b_{hop}$, $N_b$, and $n_{SRS}$ are given in subclause 5.5.3.2 of [3], and $$K = \prod_{b'=b_{hop}}^{B_{SRS}} N_b \left( \text{where } N_{b_{hop}} = 1 \text{ regardless of the } N_b \text{ value} \right), \text{ except when a}$$

single SRS transmission is configured for the UE. If a UE is configured with more than one serving cell, the UE is not expected to transmit SRS on different antenna ports simultaneously.

A UE may be configured to transmit SRS on Np antenna ports of a serving cell where Np may be configured by higher layer signalling. For PUSCH transmission mode 1 $N_p \in \{0, 1, 2, 4\}$ and for PUSCH transmission mode 2 $N_p \in \{0, 1, 2\}$ with two antenna ports configured for PUSCH and $N_p \in \{0, 1, 4\}$ with 4 antenna ports configured for PUSCH. A UE configured for SRS transmission on multiple antenna ports of a serving cell shall transmit SRS for all the configured transmit antenna ports within one SC-FDMA symbol of the same subframe of the serving cell.

The SRS transmission bandwidth and starting physical resource block assignment are the same for all the configured antenna ports of a given serving cell.

A UE not configured with multiple TAGs shall not transmit SRS in a symbol whenever SRS and PUSCH transmissions happen to overlap in the same symbol.

For TDD serving cell, when one SC-FDMA symbol exists in UpPTS of the given serving cell, it can be used for SRS transmission. When two SC-FDMA symbols exist in UpPTS of the given serving cell, both can be used for SRS transmission and for trigger type 0 SRS both can be assigned to the same UE.

If a UE is not configured with multiple TAGs, or if a UE is configured with multiple TAGs and SRS and PUCCH format 2/2a/2b happen to coincide in the same subframe in the same serving cell, The UE shall not transmit type 0 triggered SRS whenever type 0 triggered SRS and PUCCH format 2/2a/2b transmissions happen to coincide in the same subframe;

The UE shall not transmit type 1 triggered SRS whenever type 1 triggered SRS and PUCCH format 2a/2b or format 2 with HARQ-ACK transmissions happen to coincide in the same subframe;

The UE shall not transmit PUCCH format 2 without HARQ-ACK whenever type 1 triggered SRS and PUCCH format 2 without HARQ-ACK transmissions happen to coincide in the same subframe.

If a UE is not configured with multiple TAGs, or if a UE is configured with multiple TAGs and SRS and PUCCH happen to coincide in the same subframe in the same serving cell, The UE shall not transmit SRS whenever SRS transmission and PUCCH transmission carrying HARQ-ACK and/or positive SR happen to coincide in the same subframe if the parameter ackNackSRS-SimultaneousTransmission is FALSE;

For FDD-TDD and primary cell frame structure 1, the UE shall not transmit SRS in a symbol whenever SRS transmission and PUCCH transmission carrying HARQ-ACK and/or positive SR using shortened format as defined in subclauses 5.4.1 and 5.4.2A of [3] happen to overlap in the same symbol if the parameter ackNackSRS-SimultaneousTransmission is TRUE.

Unless otherwise prohibited, the UE shall transmit SRS whenever SRS transmission and PUCCH transmission carrying HARQ-ACK and/or positive SR using shortened format as defined in subclauses 5.4.1 and 5.4.2A of [3] happen to coincide in the same subframe if the parameter ackNackSRS-SimultaneousTransmission is TRUE.

A UE not configured with multiple TAGs shall not transmit SRS whenever SRS transmission on any serving cells and PUCCH transmission carrying HARQ-ACK and/or positive SR using normal PUCCH format as defined in subclauses 5.4.1 and 5.4.2A of [3] happen to coincide in the same subframe.

In UpPTS, whenever SRS transmission instance overlaps with the PRACH region for preamble format 4 or exceeds the range of uplink system bandwidth configured in the serving cell, the UE shall not transmit SRS.

The parameter ackNackSRS-SimultaneousTransmission provided by higher layers determines if a UE is configured to support the transmission of HARQ-ACK on PUCCH and SRS in one subframe. If it is configured to support the transmission of HARQ-ACK on PUCCH and SRS in one subframe, then in the cell specific SRS TABLE 3-continued subframes of the primary cell UE shall transmit HARQ-ACK and SR using the shortened PUCCH format as defined in subclauses 5.4.1 and 5.4.2A of [3], where the HARQ-ACK or the SR symbol corresponding to the SRS location is punctured.
This shortened PUCCH format shall be used in a cell specific SRS subframe of the primary cell even if the UE does not transmit SRS in that subframe. The cell specific SRS subframes are defined in subclause 5.5.3.3 of [3]. Otherwise, the UE shall use the normal PUCCH format 1/1a/1b as defined in subclause 5.4.1 of [3] or normal PUCCH format 3 as defined in subclause 5.4.2A of [3] for the transmission of HARQ-ACK and SR.
Trigger type 0 SRS configuration of a UE in a serving cell for SRS periodicity, $T_{SRS}$, and SRS subframe offset, $T_{offset}$, is defined in Table 8.2-1 and Table 8.2-2, for FDD and TDD serving cell, respectively. The periodicity $T_{SRS}$ of the SRS transmission is serving cell specific and is selected from the set $\{2, 5, 10, 20, 40, 80, 160, 320\}$ ms or subframes.
For the SRS periodicity $T_{SRS}$ of 2 ms in TDD serving cell, two SRS resources are configured in a half frame containing UL subframe(s) of the given serving cell.
Type 0 triggered SRS transmission instances in a given serving cell for TDD serving cell with $T_{SRS} > 2$ and for FDD serving cell are the subframes satisfying
$(10 \cdot n_f + k_{SRS} - T_{offset}) \bmod T_{SRS} = 0$, where for FDD $k_{SRS} = \{0, 1, 0\}$ is the subframe index within the frame, for TDD serving cell $k_{SRS}$ is defined in Table 8.2-3. The SRS transmission instances for TDD serving cell with $T_{SRS} = 2$ are the subframes satisfying $k_{SRS} - T_{offset}$.
For TDD serving cell, and a UE configured for type 0 triggered SRS transmission in serving cell c, and the UE configured with the parameter EIMTA-MainConfigServCell-r12 for serving cell c, if the UE does not detect an UL/DL configuration indication for radio frame m (as described in section 13.1), the UE shall not transmit trigger type 0 SRS in a subframe of radio frame m that is indicated by the parameter eimta-HarqReferenceConfig-r12 as a downlink subframe unless the UE transmits PUSCH in the same subframe.
Trigger type 1 SRS configuration of a UE in a serving cell for SRS periodicity, $T_{SRS,1}$, and SRS subframe offset, $T_{offset,1}$, is defined in Table 8.2-4 and Table 8.2-5, for FDD and TDD serving cell, respectively. The periodicity $T_{SRS,1}$ of the SRS transmission is serving cell specific and is selected from the set $\{2, 5, 10\}$ ms or subframes.
For the SRS periodicity $T_{SRS,1}$ of 2 ms in TDD serving cell, two SRS resources are configured in a half frame containing UL subframe(s) of the given serving cell.
A UE configured for type 1 triggered SRS transmission in serving cell c and not configured with a carrier indicator field shall transmit SRS on serving cell c upon detection of a positive SRS request in PDCCH/EPDCCH scheduling PUSCH/PDSCH on serving cell c.
A UE configured for type 1 triggered SRS transmission in serving cell c and configured with a carrier indicator field shall transmit SRS on serving cell c upon detection of a positive SRS request in PDCCH/EPDCCH scheduling PUSCH/PDSCH with the value of carrier indicator field corresponding to serving cell c.
A UE configured for type 1 triggered SRS transmission on serving cell c upon detection of a positive SRS request in subframe n of serving cell c shall commence SRS transmission in the first subframe satisfying n + k, k ≥ 4 and
$(10 \cdot n_f + k_{SRS} - T_{offset,1}) \bmod T_{SRS,1} = 0$ for TDD serving cell c with $T_{SRS,1} > 2$ and for FDD serving cell c,
$(k_{SRS} - T_{offset,1}) \bmod 5 = 0$ for TDD serving cell c with $T_{SRS,1} = 2$
where for FDD serving cell c $k_{SRS} = \{0, 1, \ldots, 9\}$ is the subframe index within the frame $n_f$ for TDD serving cell c $k_{SRS}$ is defined in Table 8.2-3.
A UE configured for type 1 triggered SRS transmission is not expected to receive type 1 SRS triggering events associated with different values of trigger type 1 SRS transmission parameters, as configured by higher layer signalling, for the same subframe and the same serving cell.
For TDD serving cell c, and a UE configured with EIMTA-MainConfigServCell-r12 for a serving cell c, the UE shall not transmit SRS in a subframe of a radio frame that is indicated by the corresponding eIMTA-UL/DL-configuration as a downlink subframe
A UE shall not transmit SRS whenever SRS and a PUSCH transmission corresponding to a Random Access Response Grant or a retransmission of the same transport block as part of the contention based random access procedure coincide in the same subframe.

Table 4 below shows the subframe offset configuration ($T_{offset}$) and UE-specific SRS periodicity ($T_{SRS}$) for trigger type 0 in FDD.

TABLE 4

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$ − 2 |
| 7-16 | 10 | $I_{SRS}$ − 7 |
| 17-36 | 20 | $I_{SRS}$ − 17 |
| 37-76 | 40 | $I_{SRS}$ − 37 |

TABLE 4-continued

| SRS Configuration Index $I_{SRS}$ | SRS Periodicity (ms) | SRS Subframe Offset |
|---|---|---|
| 77-156 | 80 | $I_{SRS}$ − 77 |
| 157-316 | 160 | $I_{SRS}$ − 157 |
| 317-636 | 320 | $I_{SRS}$ − 317 |
| 637-1023 | reserved | reserved |

Table 5 below shows the subframe offset configuration ($T_{offset}$) and UE-specific SRS periodicity ($T_{SRS}$) for trigger type 0 in TDD.

TABLE 5

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$ − 2 |
| 7-16 | 10 | $I_{SRS}$ − 7 |
| 17-36 | 20 | $I_{SRS}$ − 17 |
| 37-76 | 40 | $I_{SRS}$ − 37 |
| 77-156 | 80 | $I_{SRS}$ − 77 |
| 157-316 | 160 | $I_{SRS}$ − 157 |
| 317-636 | 320 | $I_{SRS}$ − 317 |
| 637-1023 | reserved | reserved |

TABLE 6

| SRS Configuration Index $I_{SRS}$ | SRS Periodicity (ms) | SRS Subframe Offset |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |

TABLE 6-continued

| SRS Configuration Index $I_{SRS}$ | SRS Periodicity (ms) | SRS Subframe Offset |
|---|---|---|
| 10-14 | 5 | $I_{SRS}$ − 10 |
| 15-24 | 10 | $I_{SRS}$ − 15 |
| 25-44 | 20 | $I_{SRS}$ − 25 |
| 45-84 | 40 | $I_{SRS}$ − 45 |
| 85-164 | 80 | $I_{SRS}$ − 85 |
| 165-324 | 160 | $I_{SRS}$ − 165 |
| 325-644 | 320 | $I_{SRS}$ − 325 |
| 645-1023 | reserved | reserved |

Table 7 shows $k_{SRS}$ for TDD.

TABLE 7

| | subframe index n | | | | | | | | | |
|---|---|---|---|---|---|---|---|---|---|---|
| | 0 | 1 | | 2 | 3 | 4 | 5 | 6 | | 7 | 8 | 9 |
| | | 1st symbol of UpPTS | 2nd symbol of UpPTS | | | | | 1st symbol of UpPTS | 2nd symbol of UpPTS | | | |
| $k_{SRS}$ in case UpPTS length of 2 symbols | 0 | 0 | 1 | 2 | 3 | 4 | | 5 | 6 | 7 | 8 | 9 |
| $k_{SRS}$ in case UpPTS length of 1 symbol | | 1 | | 2 | 3 | 4 | | 6 | | 7 | 8 | 9 |

Table 8 below shows the subframe offset configuration ($T_{offset,1}$) and UE-specific SRS periodicity ($T_{SRS,1}$) for trigger type 1 in FDD.

TABLE 8

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$ − 2 |
| 7-16 | 10 | $I_{SRS}$ − 7 |
| 17-31 | reserved | reserved |

Table 9 below shows the subframe offset configuration ($T_{offset,1}$) and UE-specific SRS periodicity ($T_{SRS,1}$) for trigger type 1 in TDD.

TABLE 9

| SRS Configuration Index $I_{SRS}$ | SRS Periodicity (ms) | SRS Subframe Offset |
|---|---|---|
| 0 | reserved | reserved |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ − 10 |
| 15-24 | 10 | $I_{SRS}$ − 15 |
| 25-31 | reserved | reserved |

Table 10 below shows additional channel variation characteristics (blockage effects) of a channel above 6 GHz compared to a channel below 6 GHz.

TABLE 10

| Ref. | Test description | Tx height | Rx height | Test frequency | Blockage rate relative parameter |
|---|---|---|---|---|---|
| [2] | One blocker moving (1 m/s) Horn(22.4 dBi, 12°) Patch(4.3 dBi/2.2 dBi, 58°) | 2.2/1.2 m | 1.2 m | 60 GHz | Series of Blockage event duration (threshold 5 dB) 780~1839 ms(Horn) 640~1539 ms(Patch) |
| | 4 blockers moving | | | | Series of Blockage event duration(threshold 5 dB) 688 ms(Horn, average) 278 ms(Patch, average) |
| [5] | 1~15 blockers moving The horns(22.4 dBi, 12° in azimuth, about 10° in elevation) The patches (about 3 dBi, 60° both in elevation and azimuth. The vertical polarization) | 1.58/2.77 m | 1.55 m | 60 GHz | Series of Blockage event duration (Threshold 10 dB)     (Threshold 20 dB) 300 ms(1~5 persons)  100 ms(1~5 persons) 350 ms(6~10 persons) 150 ms(6~10 persons) 450 ms(11~15 persons) 300 ms(11~15 persons) |
| [6] | — | — | — | 60 GHz | 93 ms(Mean Drop Rate) |
| [7] | One blocker moving (Walking speed) 20 dBi, 10° | 1.1 m | 0.75 m | 67 GHz | $t_D$ = 230 ms (average, Threshold 20 dB) |
| [8] | One blocker moving (Walking speed) 20 dBi, 10° | 1.1 m | 0.75 m | 67 GHz | $t_D$ = 370 ms~820 ms $t_{decay}$ = 230 ms (mean), 92 ms(s.d)(Threshold 20 dB) $t_{rising}$ = 220 ms (mean), 100 ms(s.d)(Threshold 20 dB) |

Figure 2A:
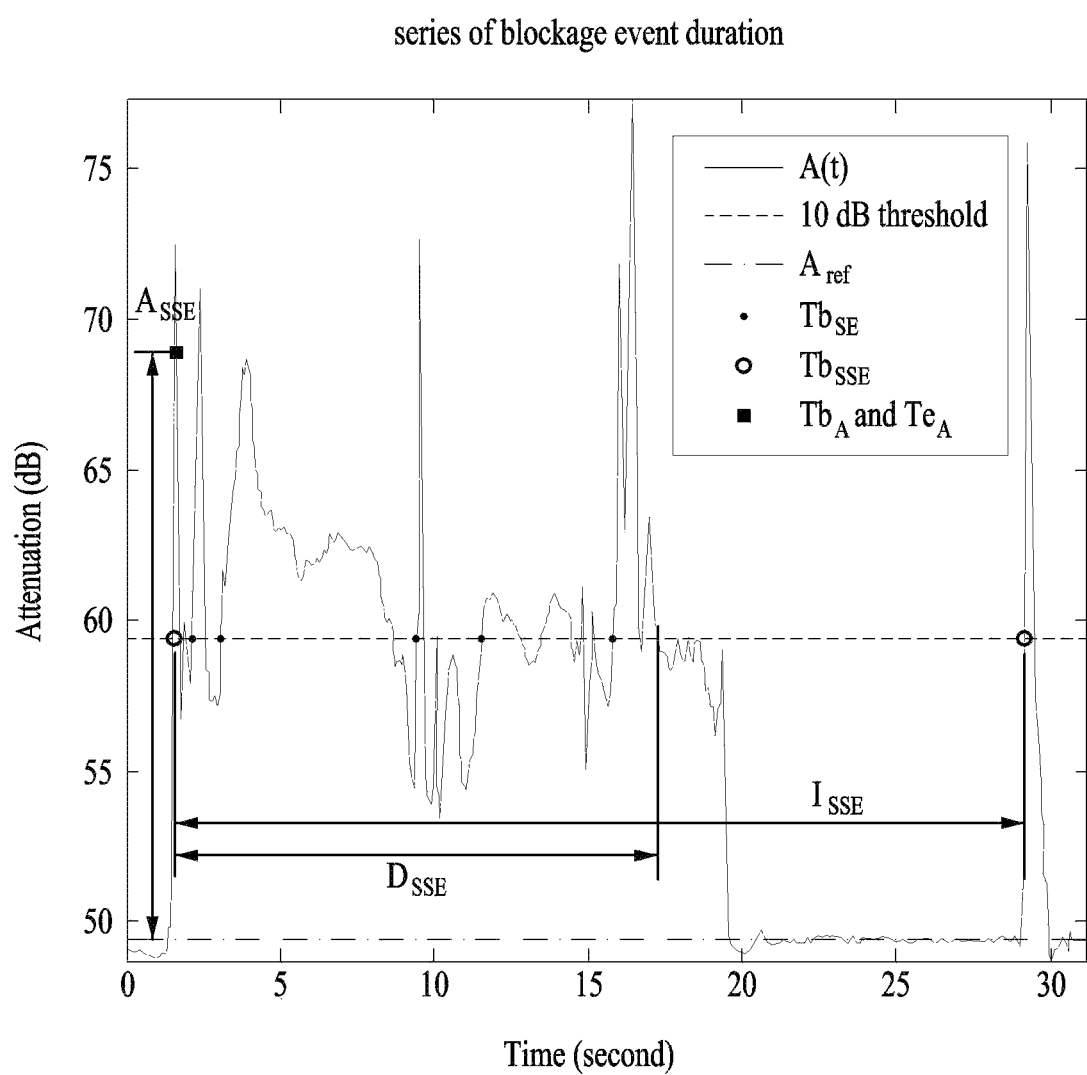
FIG. 2a shows the series of blockage event duration in Table 10 during which important blockages occur.
Figure 2B:
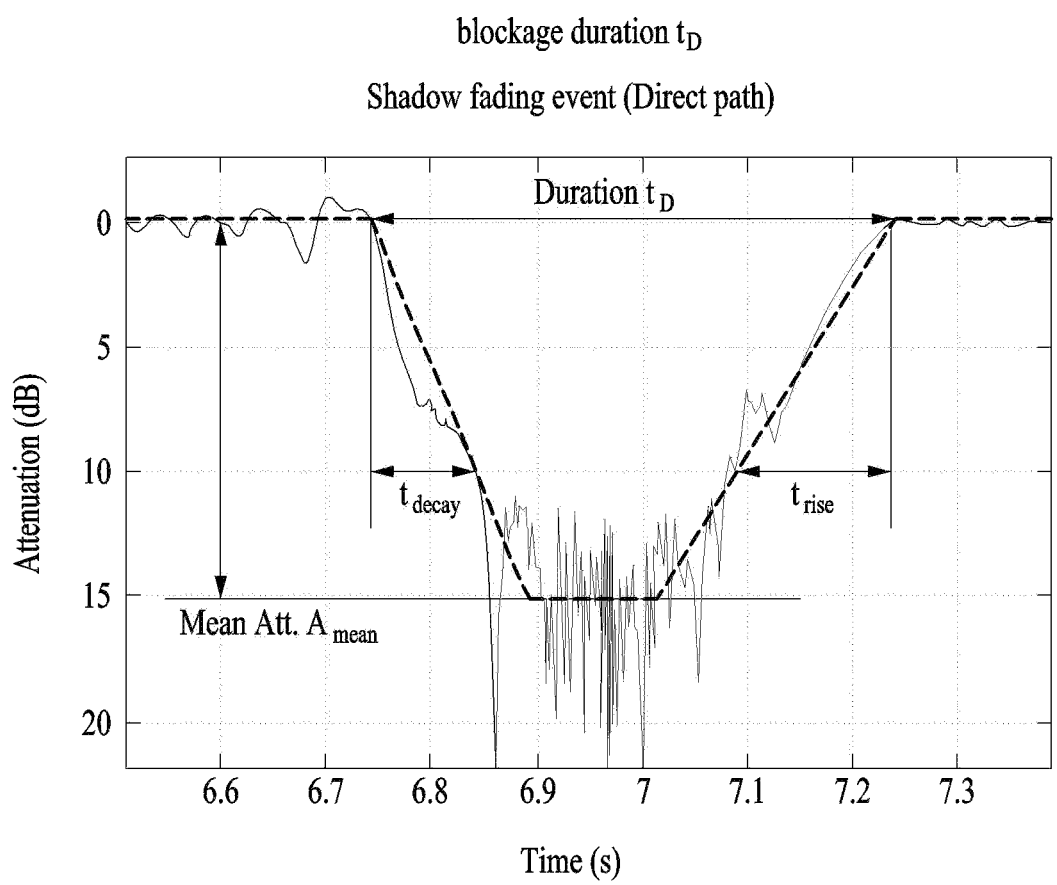
FIG. 2b shows the blockage duration ($t_D$) in Table 2.

FIG. 2 is a diagram illustrating blockage duration with reference to Table 10. Specifically, FIG. 2a shows the series of blockage event duration in Table 10 during which important blockages occur, and FIG. 2b shows the blockage duration ($t_D$) in Table 2. That is, the series of blockage event duration indicates the time during which important blockages occur, and $t_D$ indicates the period between occurrence of a blockage and the when blockage ends and the system goes back to a normal state.

Table 11 shows a pattern relationship between a UE and $t_{decay}$ and $t_{rising}$.

TABLE 11

| | Walking (0.6 m/s)[7] | Sprinting (10 m/s)[9] | Swift Hand swing (43 m/s) |
|---|---|---|---|
| $t_{decay}$, $t_{rising}$ (ms) | 150 ms (measure) | 9 ms (calculation) | 2.093 ms (calculation) |

Although Table 11 shows that a blockage change is basically estimated to about average 100 ms (the speed of a walking obstacle (4 km/h)), it can vary from 2 ms to hundreds of ms depending on UE's patterns and surrounding environments.

For UE Tx beam tracking, a UE needs to transmit an SRS for each candidate Tx beam of the UE. As the number of candidate UE Tx beams increases, the number of SRS symbols increases due to repetitive SRS transmission for beam tracking. Accordingly, different frame structures are configured for a serving cell (or a serving base station) and neighboring cells (or neighboring base stations). In particular, the SRS channel strongly interferes with other cells in UE Tx beam tracking on the uplink. In the present disclosure, a method for reducing interference between the SRS and other UL channels by pre-identifying and removing the candidate UE Tx beam ID which is likely to provide a large amount of interference in UE Tx tracking will be proposed.

Necessity for Beam Tracking

Figure 3:
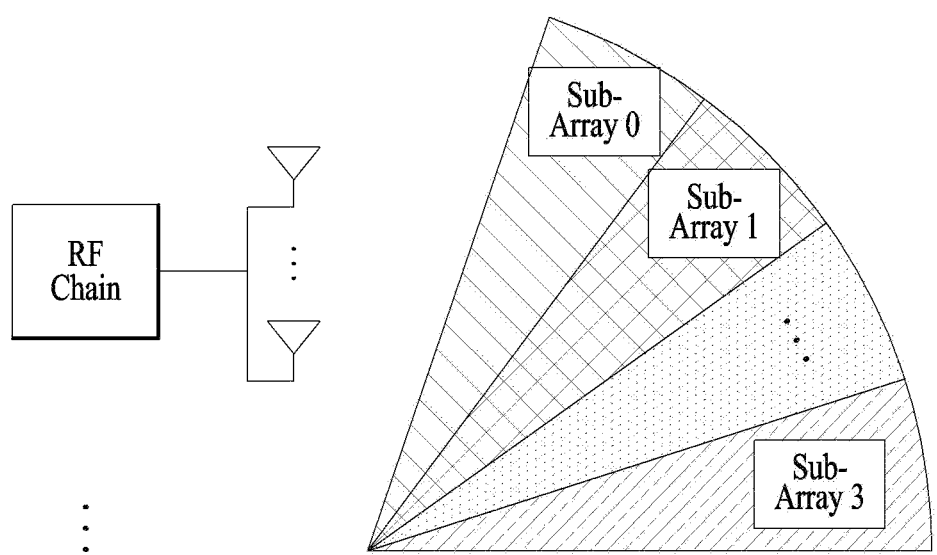
FIG. 3 is a diagram illustrating a wide beam composed of four narrow beams.

When multiple beams are properly placed, a wide beam can be defined as shown in FIG. 3.

FIG. 3 is a diagram illustrating a wide beam composed of four narrow beams.

Referring to FIG. 3, the wide beam is defined using four sub-arrays. The present disclosure assumes that a transmitter transmits a synchronization signal using the wide beam. In other words, it is assumed that the same Primary Synchronization Signal/Secondary Synchronization Signal/Physical Broadcast Channel (PSS/SSS/PBCH) is transmitted on all sub-arrays.

Meanwhile, when multiple beams are defined to cover a wide area, beam gain may decrease. To solve the above trade-off, additional power gain can be provided by repeating transmission in the time domain. Based on the repeated transmission, a structure of a synchronization subframe may be shown in FIG. 4.

Figure 4:
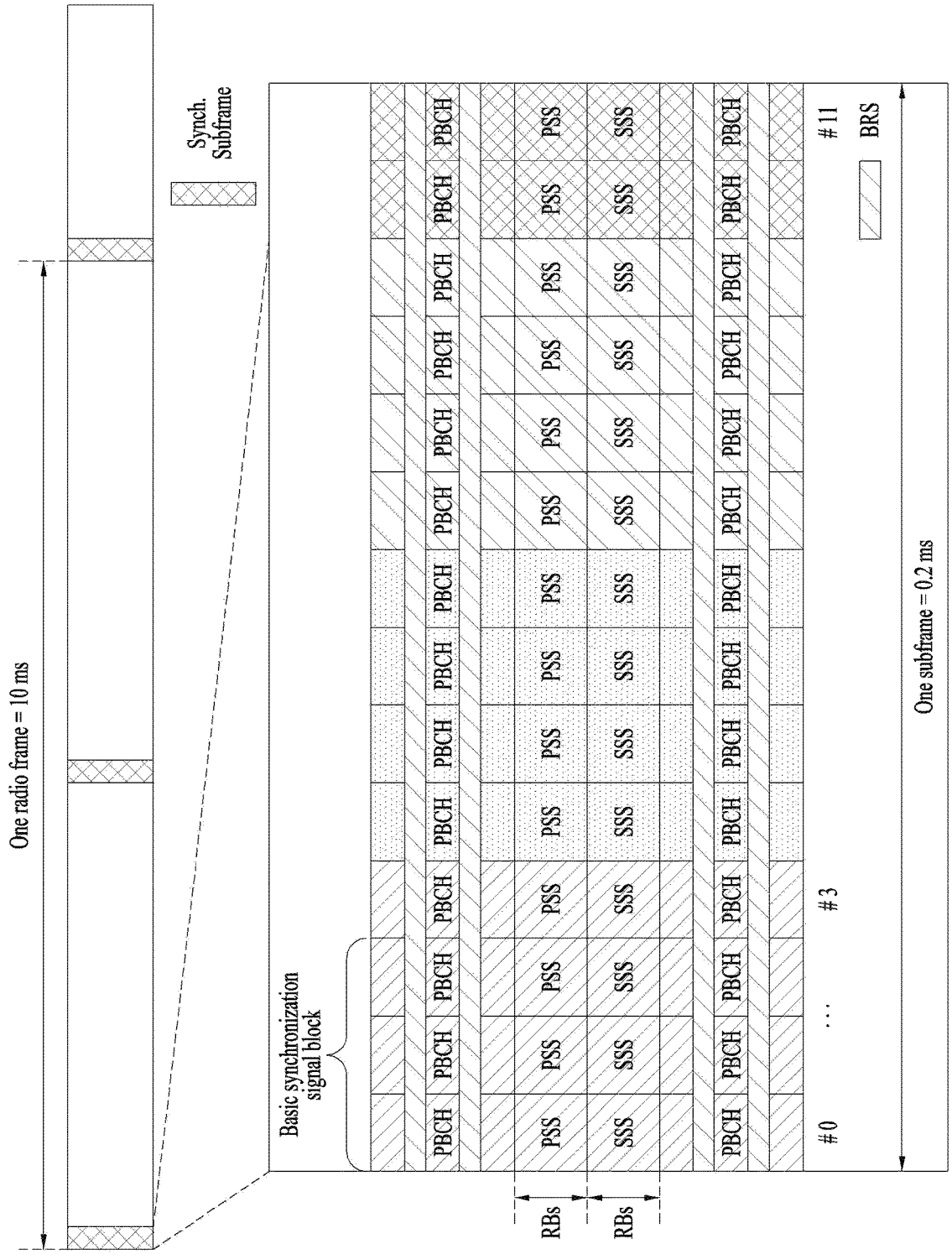
FIG. 4 is a diagram illustrating the structure of a synchronization subframe.

FIG. 4 is a diagram illustrating the structure of a synchronization subframe.

Specifically, FIG. 4 shows not only the structure of the synchronization subframe but also PSS/SSS/PBCH defined therein. In FIG. 4, blocks with the same type of hatching indicate a group of Orthogonal Frequency Division Multiplexing (OFDM) symbols where the same RF beam group (defined using four sub-array beams) is applied. That is, four OFDM symbols use the same multi-RF beam. In new RAT, based on the structure of FIG. 4, a beam scanning period can be generally configured as shown in FIG. 5.

Figure 5:
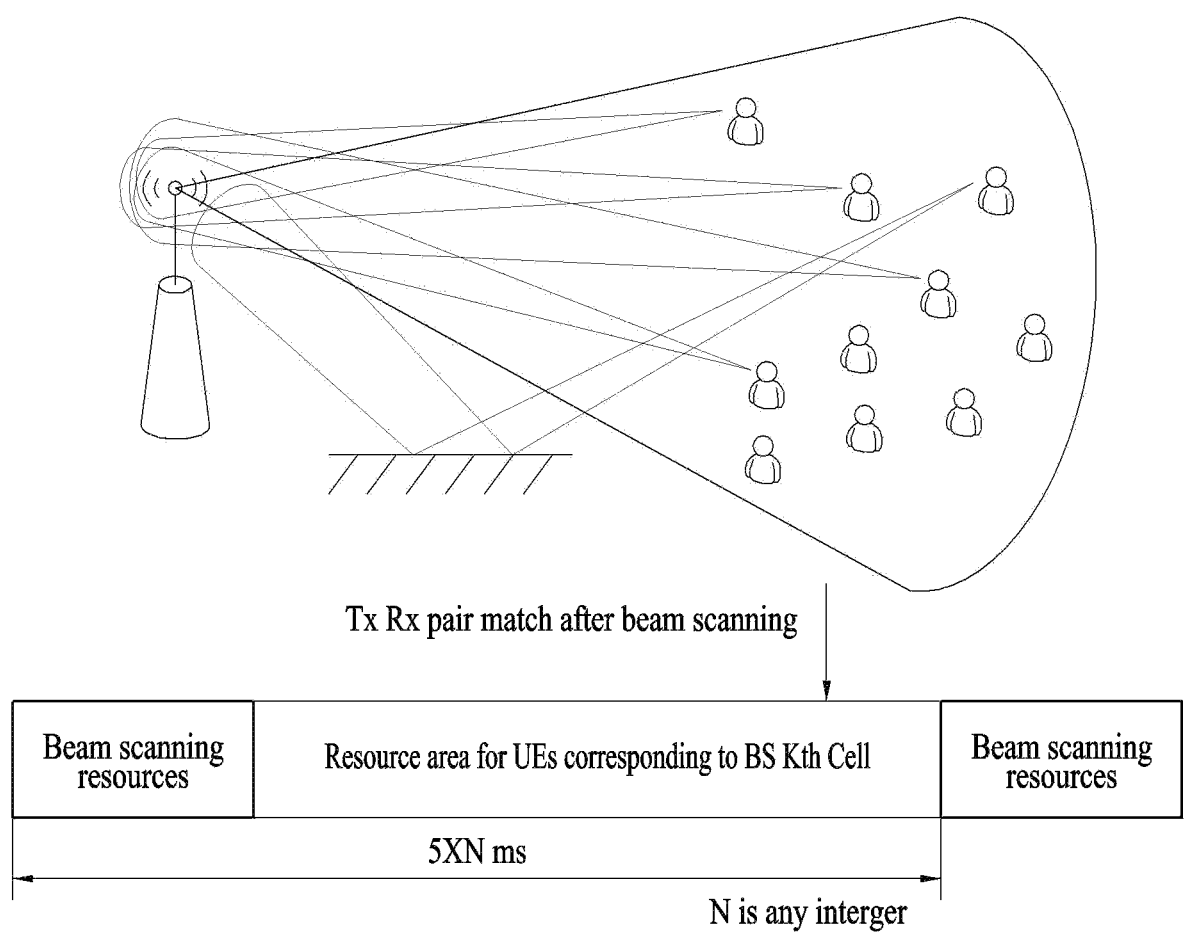
FIG. 5 is a diagram illustrating a beam scanning period and a resource area (for example, 5XN ms period).

FIG. 5 is a diagram illustrating a beam scanning period and a resource area (for example, 5×N ms period).

Since a beam scanning process basically has significant processing overhead, beam scanning cannot be completed within a very short period. In addition, the temporal variation of a channel above 6 GHz is expected to be much faster than that of a channel below 6 GHz due to the aforementioned additional channel elements. Moreover, in a cellular system, a Base Station (BS) may have a fixed beam configuration, whereas a UE may have different beams depending on serving cell locations, changes in its surrounding environment, UE behavior patterns, etc. That is, a Tx/Rx beam mismatch is highly likely to occur within a beam scanning period. To overcome the Tx/Rx beam mismatch, a beam tracking method is required.

In the case of downlink transmission, beam tracking can be performed by applying a UE Rx beam to each of the BRSs shown in FIG. 4 and measuring Reference Signal Received Power (RSRP) thereof. If reciprocity is established between Tx/Rx beam pairs (i.e., BS Tx beam/UE Rx beam pair and UE Tx beam/BS Rx beam pair) for downlink transmission, a Tx/Rx beam pair obtained from each BRS can be applied to uplink transmission. Otherwise, an SRS may be used for uplink transmission. To achieve the most powerful uplink beam tracking, SRSs should be transmitted for all Tx beam IDs of each UE. However, this SRS transmission may decrease a Physical Uplink Shared Channel (PUSCH) transmission region, and thus uplink throughput may decrease.

Figure 6:
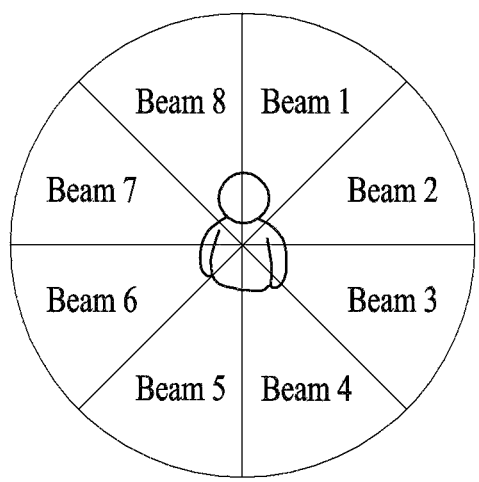
FIG. 6 is a diagram transmission of SRSs corresponding to UE beam IDs (the number of UE Tx beam IDs=8).

FIG. 6 is a diagram transmission of SRSs corresponding to UE beam IDs (the number of UE Tx beam IDs=8).

It can be seen from FIG. 6 that as the number of UE beam IDs increases, the SRS transmission region increases. If periodic SRS transmission is introduced to beam tracking for matching a pair of UE Tx beams and BS RX beams, that is, for establishing UE Tx/BS Rx beam pairs, the number of SRSs for fixed UE Tx candidate beams may be configured by higher layers (for example, a BS may inform the number of SRS transmissions for the fixed UE Tx candidate beams via higher layer signaling (e.g., RRC signaling)). However, if aperiodic SRS transmission is introduced, an additional SRS transmission region is required for additional UE Tx candidate beams. In addition, as the aperiodic SRS transmission is triggered by a UE or a BS, an SRS transmission configuration, which is generated for aperiodic beam tracking, may be presented differently in each beam tracking subframe. Moreover, signaling information for the beam tracking should be provided to UEs whenever the aperiodic SRS transmission is triggered. As a result, signaling overhead may increase. Therefore, a method of efficiently arranging an SRS transmission region and a PUSCH transmission region and a method of reducing signaling overhead thereof are required.

Embodiment 1

An SRS transmission pool (or transmission region) is configured to allocate resources for aperiodic SRS transmission. In this case, it is assumed that BS's Tx and Rx beams are not changed in a subframe for UE Tx tracking.

Figure 7B:
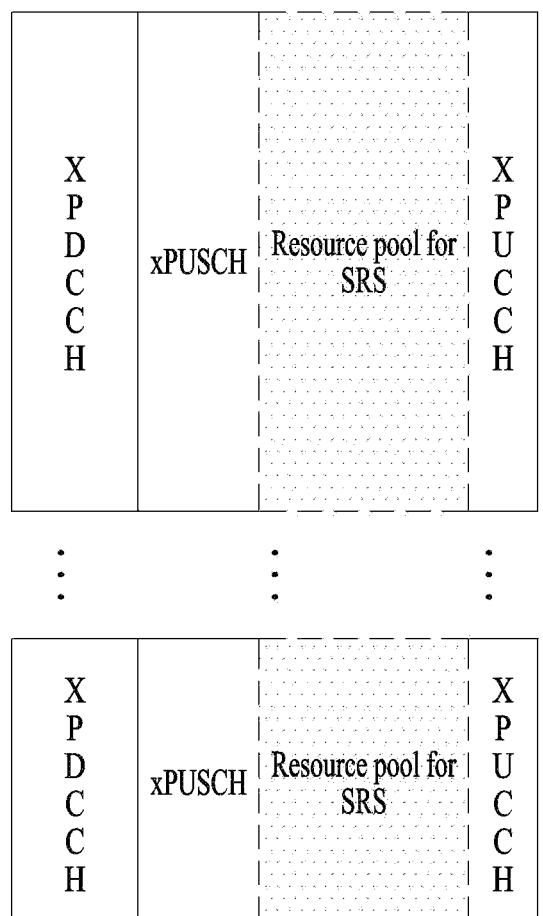
FIG. 7 is a diagram illustrating the configuration of an SRS transmission resource pool in a self-contained subframe structure.

FIG. 7 is a diagram illustrating the configuration of an SRS transmission resource pool in a self-contained subframe structure. Specifically, FIG. 7a shows a basic(default) self-contained subframe structure, FIG. 7b shows an SRS transmission resource pool (when an xPUCCH is configured), and FIG. 7c shows an SRS transmission resource pool.

FIG. 7a shows the basic(default) self-contained subframe structure. In this case, a physical downlink control channel (e.g., xPDCCH) may be located from the first symbol of the subframe to a predetermined number of symbols of the subframe, and a physical uplink control channel (e.g., xPUCCH) may be located across a predetermined number of symbols including the last symbol of the subframe. In addition, a physical downlink shared channel (e.g., xPDSCH) corresponding to a downlink data channel and a physical uplink shared channel (e.g., xPUSCH) corresponding to an uplink data channel may be located between the xPDCCH and the xPUCCH.

Referring to FIG. 7b, when resources for a physical uplink shared channel (e.g., xPUSCH) corresponding to an uplink data channel are located after a physical downlink control channel (e.g., xPDCCH) and resources for a physical uplink control channel (e.g., xPUCCH) are located in the last symbol within one subframe, the resource pool for the SRS transmission may be configured in front of the xPUCCH.

Alternatively, referring to FIG. 7c, when no xPUCCH is configured or scheduled by a Downlink Control Information (DCI) format included in the xPDCCH, the resource region for the SRS transmission may be configured from the last symbol.

The locations of the channels, i.e., xPDCCH, xPUSCH, and xPUCCH may vary depending on subframe types. However, the size of the SRS transmission pool should satisfy the condition of $N_{sym}^{SRS\_pool} \leq N_{sym}^{xPUSCH}$, where $N_{sym}^{SRS\_pool}$ is the total number of SRS symbols that can be allocated to the SRS resource pool and $N_{sym}^{xPUSCH}$ is the number of xPUSCH symbols in the corresponding subframe. In this case, a gap symbol(s) may be configured between the xPDCCH symbols and xPUSCH symbols.

The default configuration of the basic SRS resource pool may mean that all symbols in the SRS resource pool are used for xPUSCH transmission. Hereinafter, how the size of an SRS transmission resource pool is configured will be described with reference to an embodiment thereof. Table 12 below shows examples for SRS resource pool sizes.

TABLE 12

| Configuration | a number of symbols $N_{sym}^{SRS-pool}$ in a SRS pool |
|---|---|
| 0 | 0 |
| 1 | 2 |
| 2 | 4 |
| 3 | 8 |

When an SRS resource pool size is configured as shown in Table 12, if the equation of $N_{sym}^{xPUSCH}=10$ is satisfied in the case of configuration 3, the condition of $N_{sym}^{SRS\_pool} \leq N_{sym}^{xPUSCH}$ can be satisfied. Consequently, the resource pool can be used.

Hereinafter, a method of transmitting SRS symbols in an SRS resource pool will be described (with reference to examples of ascending and descending order).

FIG. 8 is a diagram illustrating SRS transmission symbol indexes (configured in ascending and descending order) in an SRS resource pool.

When an SRS resource pool is able to be configured in ascending or descending order as shown in FIG. 8, a BS may transmit an indicator indicating the SRS resource pool configuration (e.g., ascending order setting, descending order setting, etc.) to a UE or predetermine the SRS resource pool configuration through a System Information Block (SIB). In this case, SRS symbol transmission locations in the corresponding pool may be determined based on $n_0^{SRS\_pool}$. Alternatively, the SRS symbol transmission locations in the corresponding pool may be configured by higher layers. The BS may inform the UE the SRS symbol transmission locations through higher layer signaling (e.g., RRC signaling).

Figure 9:
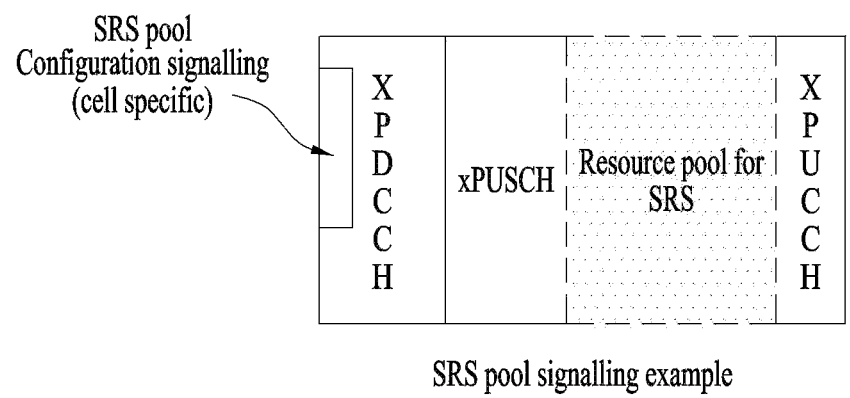
FIG. 9 is a diagram illustrating a method of signaling an SRS resource pool.

FIG. 9 is a diagram illustrating a method of signaling an SRS resource pool.

Specifically, FIG. 9 shows a method by which a BS transmits SRS resource pool configuration information to a UE on a cell-specific xPDCCH. In this case, the SRS resource pool configuration information or information on the SRS resource pool can be signaled not only through cell-specific xPDCCH but also via higher layer signaling.

Embodiment 1-1

Signaling for an SRS resource pool is configured in cell specific xPDCCH.

Information which is transmitted by a BS to indicate an SRS resource pool for UE Tx beam tracking (on a cell-specific xPDCCH or via higher layer signaling) may include the following information: 1, 2, and 3.

1. SRS resource pool type indicator: The indicator may increase depending on the number of pool types. For example, if there are only two resource pool types: ascending order and descending order, one modulated bit can sufficiently indicate the value of '0' or '1'.
2. SRS resource pool start symbol index or SRS resource pool start index depending on pool types
3. SRS resource pool size, $N_{sym}^{SRS\_pool}$ or SRS resource pool size depending on pool types If the BS triggers SRS transmission for the beam tracking, the number of SRS transmission symbols in the corresponding SRS resource pool can be represented using $n_l^{SRS\_pool}$ where l=l+1. Thus, the entire SRS transmission symbol set in a beam tracking subframe can be represented as $\{n_0^{SRS\_pool}, \ldots, n_l^{SRS\_pool}\}$.

The SRS resource pool and corresponding SRS transmission symbols therein can be initialized at every beam scanning. Alternatively, the initialization can be indicated by higher layers.

In the case of $N_{sym}^{SRS\_pool}<l$, additional SRS transmission is not allowed even if the beam tracking is triggered. However, the BS may provide relevant feedback (e.g., 1-bit feedback) to each UE over an xPUSCH in a UE-specific manner.

Embodiment 1-2

The BS may transmit UE Tx beam candidate configuration information to a UE on a UE-specific xPDCCH. In a cell, each UE has different Tx beam candidates. Thus, when the BS requires additional SRS transmission, the BS may transmit relevant UE Tx beam candidates on an xPDCCH in a UE-specific manner. The UE Tx beam candidate may correspond to a UE Rx beam index among good BS Tx beam/UE Rx beam pairs except the UE Rx beam paired with the current BS Tx beam during beam scanning.

Embodiment 1-3

According to an SRS symbol transmission rule, an SRS resource pool may have a different SRS transmission type depending on system requirements.

Hereinafter, SRS transmission types will be described. Assuming that in one beam tracking subframe, a symbol with a maximum number of candidate beams for beam tracking is defined as $n_{sym}^{SRS\_max}$ and a symbol with a minimum number of candidate beams is defined as $n_{sym}^{SRS\_min}$, SRS resources can be allocated as shown in FIG. 10.

Figure 10:
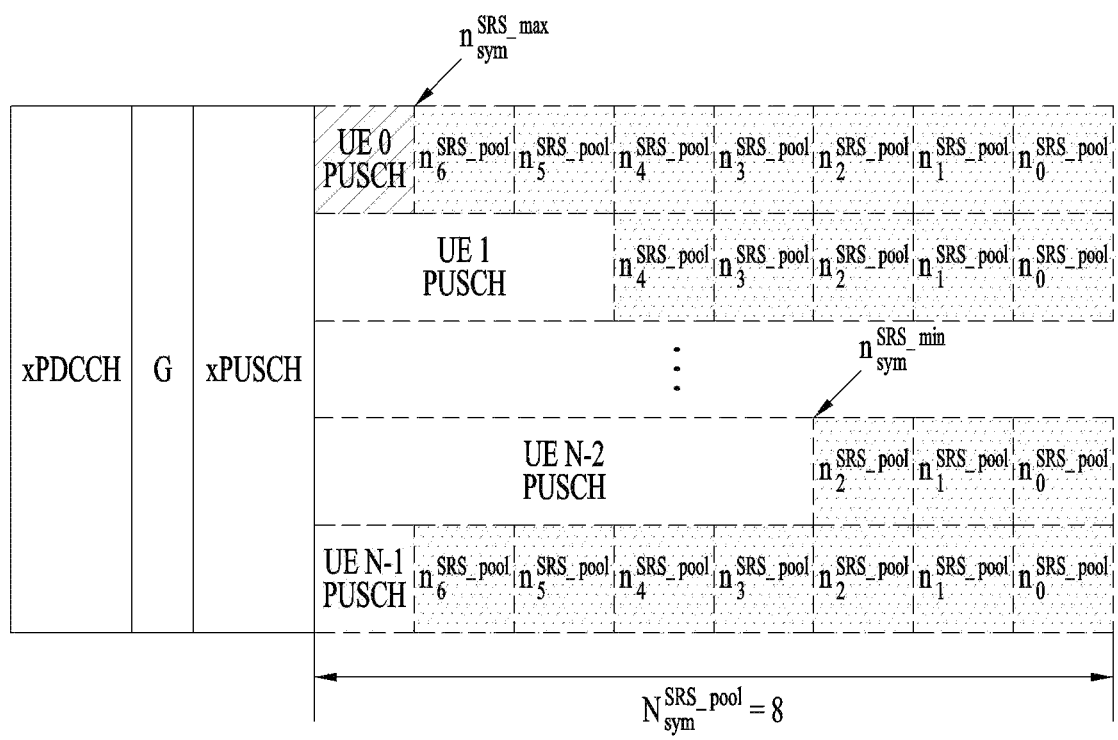
FIG. 10 is a diagram SRS resource pools according to UE-specific beam tracking triggering ($N_{sym}^{SRS\_pool}=8$ the case of UL FDMA).

FIG. 10 is a diagram illustrating SRS resource pools according to UE-specific beam tracking triggering ($N_{sym}^{SRSP\_pool}$=8 in the case of UL FDMA).

Specifically, FIG. 10 shows SRS resources in the SRS pools according to the UE-specific beam tracking triggering. UE 0 has the largest SRS resource pool, and UE N-2 has the smallest SRS resource pool.

Figure 11:
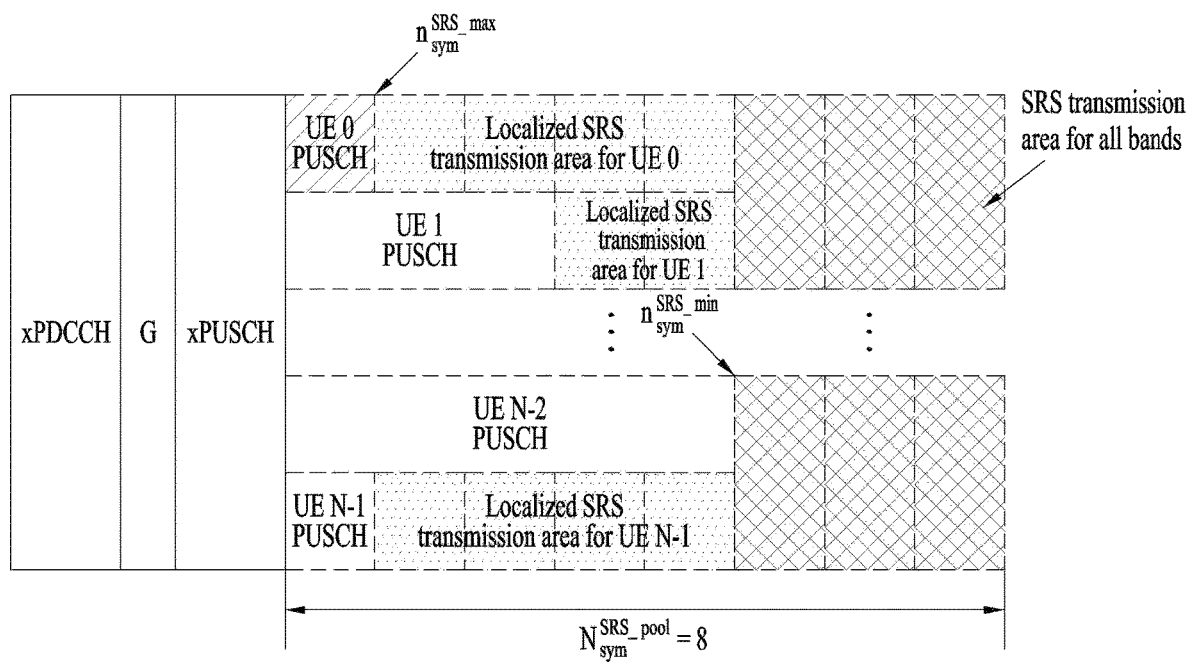
FIG. 11 is a diagram illustrating SRS resources in accordance with SRS transmission type 0 (basic type in the case of UL FDMA).

FIG. 11 is a diagram illustrating SRS resources in accordance with SRS transmission type 0 (basic type in the case of UL FDMA).

Referring to FIG. 11, an SRS resource pool according to SRS transmission type 0 can include both a localized SRS transmission region and a full-band SRS transmission region. Specifically, symbols from symbol $n_0^{SRS\_pool}$ to symbol $n_{sym}^{SRS\_min}$ may be configured for full-band (or full-bandwidth) transmission (including UL resource allocation). In addition, a UE-specific SRS transmission region composed of symbols from $n_{sym}^{SRS\_min}$ to $n_{sym}^{SRS\_max}$ may be set to the localized SRS transmission region. In this case, a BS may inform each UE about the location of xPUSCH resources for each UE in an SRS transmission resource pool. The BS may transmit, to each UE corresponding to SRS transmission type 0, information on its localized SRS transmission region (e.g., the start symbol index of the localized SRS transmission) and/or information on the full-band SRS transmission region (e.g., the start symbol index of the full-band SRS transmission).

Figure 12:
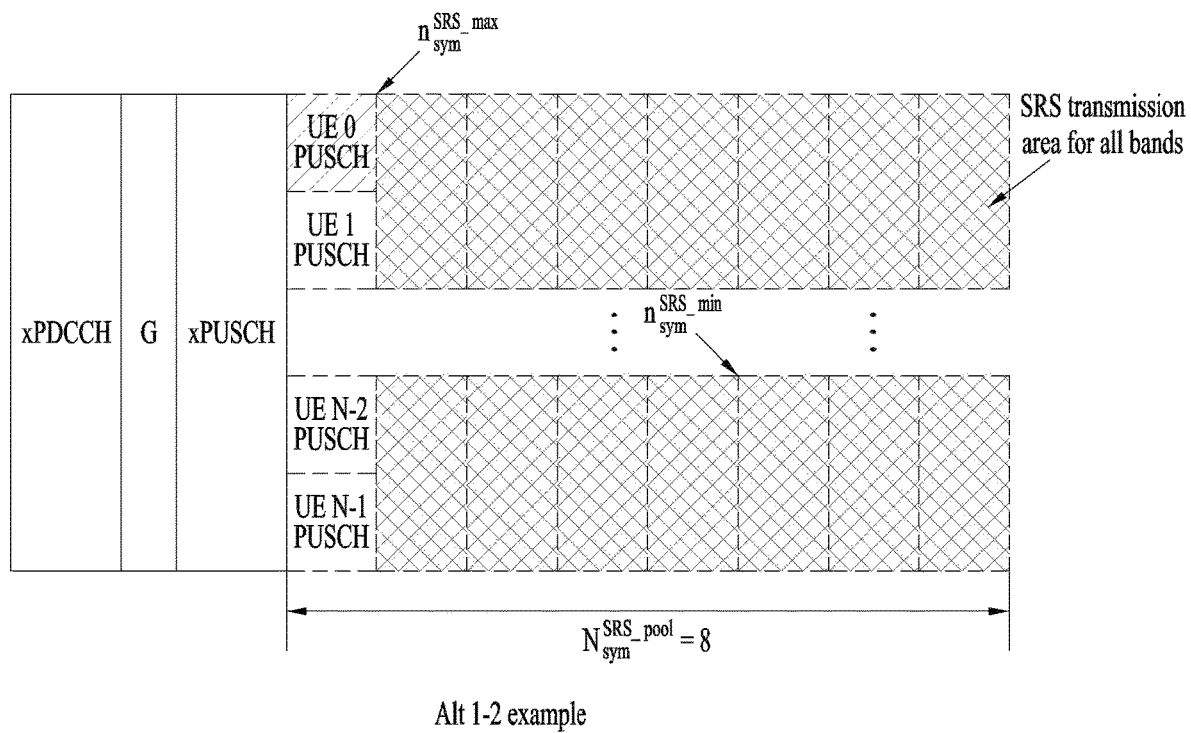
FIG. 12 is a diagram illustrating SRS resources in accordance with SRS transmission type 1 (in the case of UL FDMA).

FIG. 12 is a diagram illustrating SRS resources in accordance with SRS transmission type 1 (in the case of UL FDMA).

Referring to FIG. 12, an SRS resource pool according to SRS transmission type 1 can include only a full-band SRS transmission region. Specifically, symbols up to symbol $n_{sym}^{SRS\_max}$ may be configured for full-band SRS transmission. In this case, a BS may inform UEs in a cell about the location of symbol $n_{sym}^{SRS\_max}$ using a cell-specific xPDCCH. The SRS resource pool shown in FIG. 12 can be used to emphasize beam tracking. In the SRS resource pool, xPUSCH resources can be used from symbols after symbol sym $n_{sym}^{SRS\_max}$.

Figure 13:
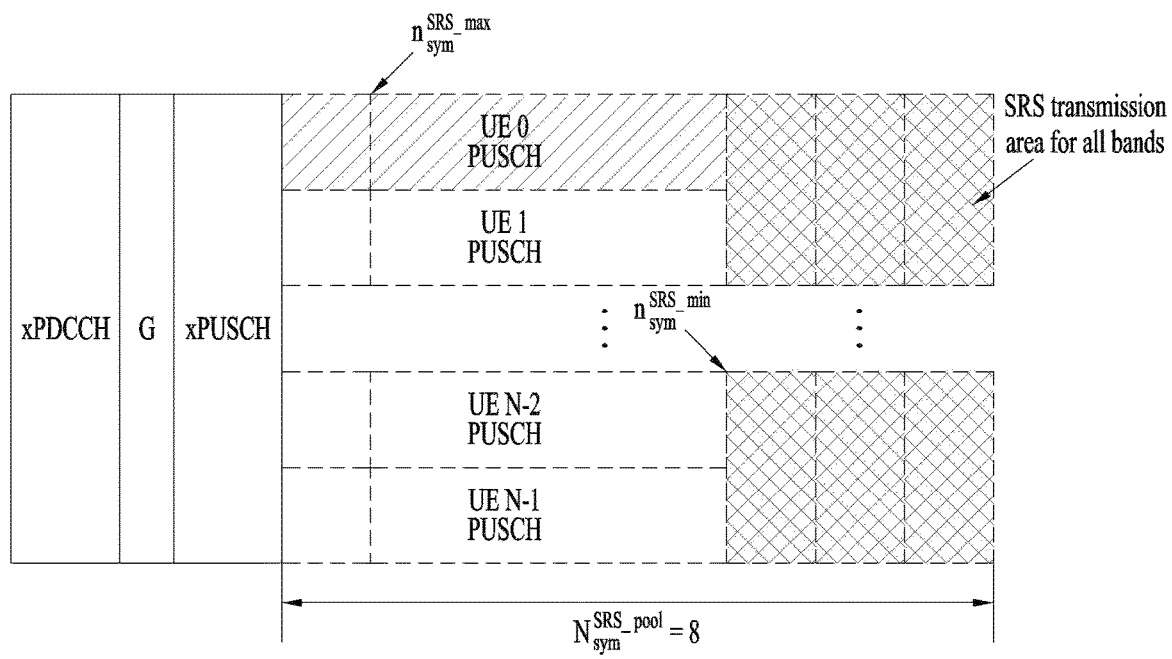
FIG. 13 is a diagram illustrating SRS resources in accordance with SRS transmission type 2 (in the case UL FDMA).

FIG. 13 is a diagram illustrating SRS resources in accordance with SRS transmission type 2 (in the case UL FDMA).

Referring to FIG. 13, an SRS resource pool according to SRS transmission type 2 can include only a full-band SRS transmission region. Specifically, symbols up to symbol $n_{sym}^{SRS\_min}$ may be configured for full-band SRS transmission. In this case, a BS may inform UEs in a cell about the location of symbol $n_{sym}^{SRS\_min}$ using a cell-specific xPDCCH. Even if the UE Tx beam tracking is triggered, symbols beyond symbol $n_{sym}^{SRS\_min}$ are excluded. Therefore, the SRS resource pool according to SRS transmission type 2 can be used when uplink resource transmission is more important.

In the SRS transmission types illustrated in FIGS. 11 to 13, hatched resource regions represented as the localized SRS transmission region can be used only for the UE Tx beam tracking, and hatched regions represented as the full-band SRS transmission region can be used for both the beam tracking and uplink resource allocation (that is, both localized-type transmission and comb-type transmission are possible).

Table 13 below summarizes SRS types.

TABLE 13

| SRS type | Description |
| --- | --- |
| 0 | Default |
| 1 | a type emphasized in beam tracking |
| 2 | a type emphasized in xPUSCH resource allocation |
| 3 | Reserved |

Embodiment 2

Hereinafter, aperiodic SRS transmission methods (BS triggering method and UE triggering method) will be described.

Figure 14:
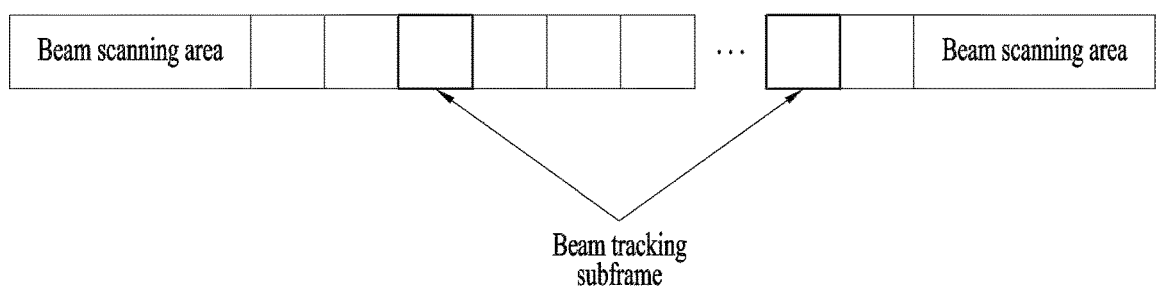
FIG. 14 is a diagram illustrating an assumption for selection of a beam tracking subframe.

FIG. 14 is a diagram illustrating an assumption for selection of a beam tracking subframe.

Referring to FIG. 14, a beam tracking subframe for aperiodic SRS transmission may be configured by higher layers (it is signaled to a UE through higher layer signaling). Alternatively, it may be configured using a method of selecting a periodic SRS transmission subframe.

Embodiment 2-1

BS-Triggering Method

Figure 15:
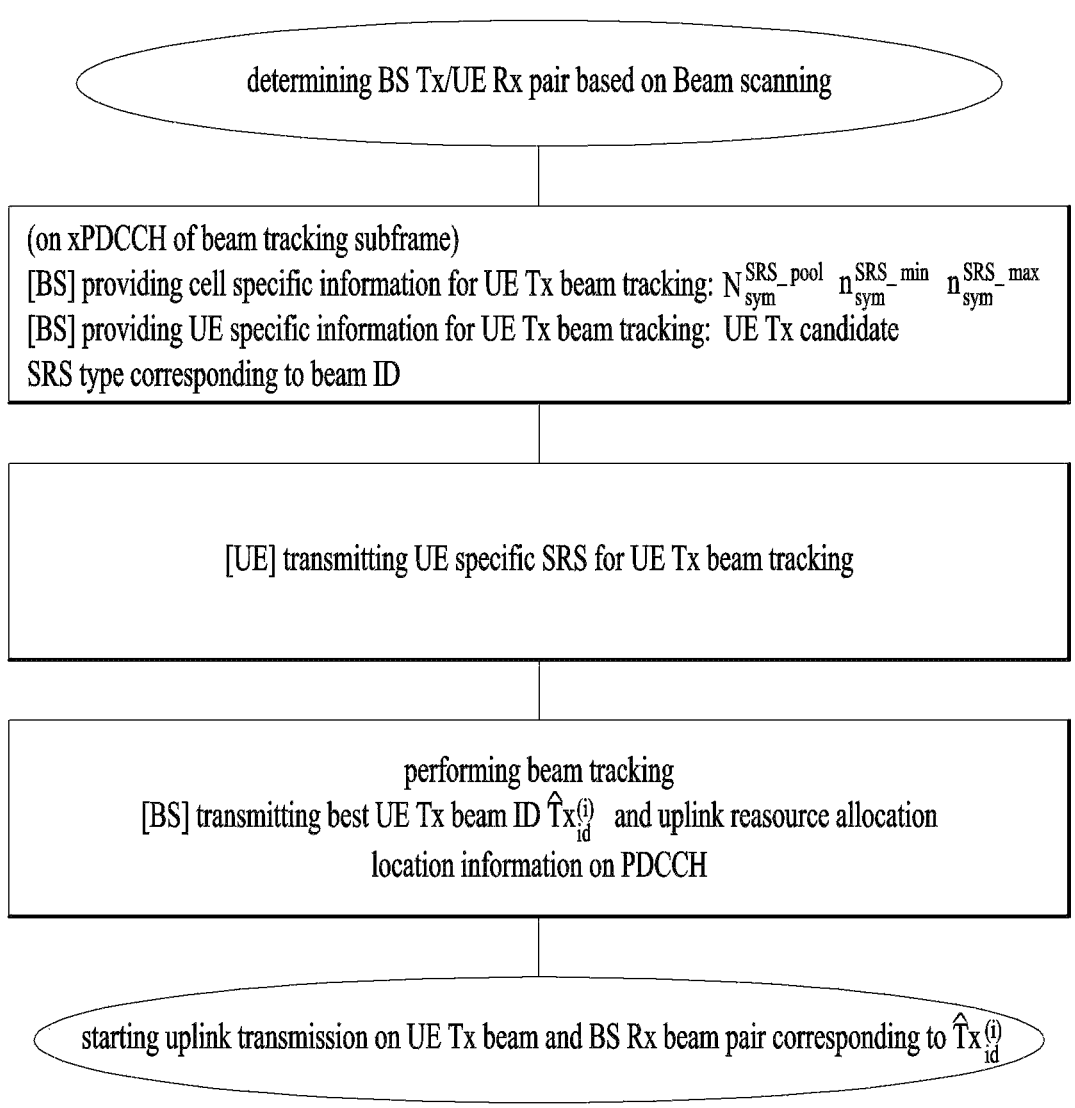
FIG. 15 is a flowchart illustrating aperiodic SRS transmission triggered by a BS.

FIG. 15 is a flowchart illustrating aperiodic SRS transmission triggered by a BS.

Referring to FIG. 15, a UE may determine BS Tx beam/UE Rx beam pairs through beam scanning together with the BS. The BS may transmit, to the UE, cell-specific information for the UE Tx beam tracking (e.g., an SRS resource pool size, $N_{sym}^{SRS\_pool}$, $n_{sym}^{SRS\_max}$, $n_{sym}^{SRS\_min}$, etc.) on an xPDCCH in a beam tracking subframe. In addition, the BS may transmit, to the UE, UE-specific information for the UE Tx beam tracking (e.g., an SRS type corresponding to a UE Tx candidate beam ID) on the xPDCCH in the beam tracking subframe. The SRS type in the UE-specific information indicates an SRS transmission state and can be determined by a transmission comb pattern, whether there is localized SRS transmission, or whether there is full-band SRS transmission.

The UE transmits UE-specific SRSs for the UE Tx beam tracking, and the BS starts the beam tracking. After performing the beam tracking, the BS may transmit the ID of the best UE Tx beam ($\widetilde{Tx}_{id}^{(i)}$) and uplink resource allocation location information to the UE on a PDCCH. Thereafter, the UE can start uplink transmission using a UE Tx beam and BS Rx beam pair corresponding to the best UE Tx beam ID.

Embodiment 2-2

UE-Triggering Method

Figure 16:
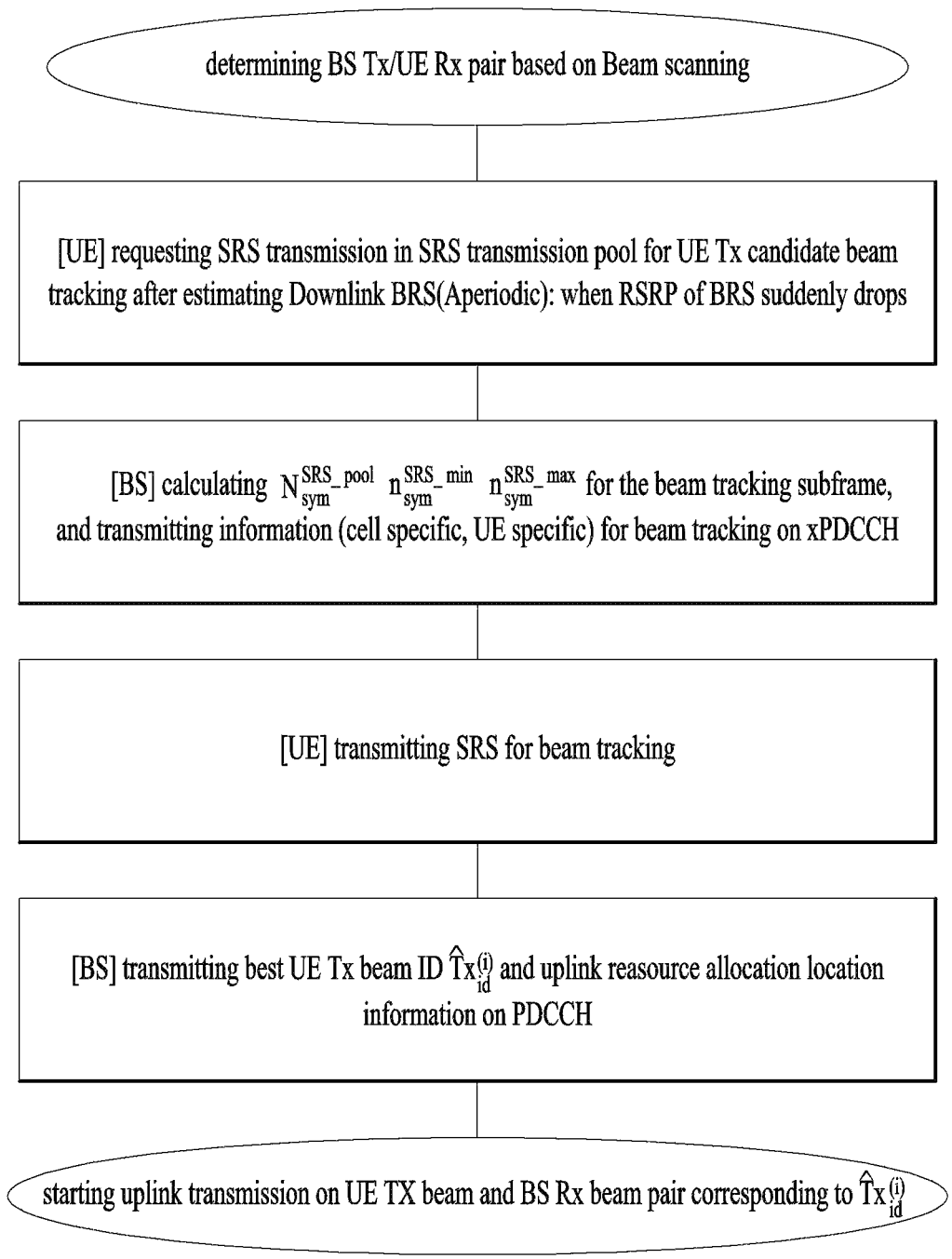
FIG. 16 is a flowchart illustrating aperiodic SRS transmission triggered by a UE.

FIG. 16 is a flowchart illustrating aperiodic SRS transmission triggered by a UE.

Referring to FIG. 16, the UE may determine BS Tx beam/UE Rx beam pairs through beam scanning together with a BS. After measuring a downlink BRS, the UE may require aperiodic SRS transmission within an SRS transmission pool for tracking UE Tx candidate beams. In particular, when the RSRP of the BRS suddenly decreases, the SRS transmission may be triggered.

The BS may calculate an SRS resource pool size, $N_{sym}^{SRS\_pool}$, $n_{sym}^{SRS\_max}$, $n_{sym}^{SRS\_min}$, etc. for a beam tracking subframe. In addition, the BS may transmit, to the UE, information for the beam tracking (i.e., cell-specific and UE-specific information for the beam tracking) on an xPDCCH.

The UE transmits SRSs for the UE Tx beam tracking, and the BS starts the beam tracking. After completing the beam tracking, the BS may transmit the ID of the best UE Tx beam ($\widetilde{Tx}_{id}^{(i)}$) and uplink resource allocation location information to the UE on a PDCCH. Thereafter, the UE can start uplink transmission using a UE Tx beam and BS Rx beam pair corresponding to the best UE Tx beam ID.

One shot Multiple SRS Resource Triggering Configuration Method and Beam or Port Mapping Method The above-described method is a technique for a configuration for maintaining minimum UL data transmission while performing UL Tx beam refinement by limiting the SRS resource region. As an alternative method, when the number of candidate beams of a specific UE, M, or the total number of ports mapped to the respective candidate beams, $\Sigma P_i$, exceeds the SRS resource region $N_{sym}^{SRS\_pool}$ for UL Tx beam refinement (i.e., $N_{sys}^{SRS\_pool} < M$, $P_{total}^{SRS\_pool} < \Sigma P_i$, where $P_{total}^{SRS\_pool}$ denotes the maximum number of ports for transmission within the SRS resource), the remaining candidate beams or ports that have not been transmitted in the SRS resource region may be mapped to other multiple SRS resources to perform UL Tx beam refinement on all candidate Tx beams or ports of the UE. Alternatively, in order to improve the UL Tx beam refinement performance of the UE, multiple SRSs corresponding to one or more of the same candidate Tx beams may be transmitted in multiple SRS resource regions.

In the following description, the term "beam information" may be used as a concept including resource information related to beams or beam management.

Embodiment 3

When the total number (M) of UL beams to be transmitted for the UL beam sweeping/refinement operation or the number of required SRS beams ($\Sigma P_i$) exceeds the maximum number ($N_{sym}^{SRS\_pool}$) of transmittable SRS beams or the number of ports ($P_{total}^{SRS\_pool}$) one slot/subframe, the BS may indicate, to the UE, a message for requesting SRS transmission over a plurality of slots/subframes, through downlink control information (DCI) (MAC CE, RRC signaling, or the like).

In the new numerology of the new RAT (NR) system, 14 symbol units may be one transmission Time interval (TTI).

Embodiment 3-1

The BS may perform, through a single DCI, SRS transmission allocation to be performed over a plurality of slots/subframes or may transmit a separate DCI to the UE in every slot/subframe. In the latter case, a rule may be defined such that, if the UL beam information is omitted from the DCI transmitted in a subsequent slot/subframe, the UL beam(s) to be transmitted on the SRS resource allocated to the UE shall be consecutively allocated to the indexes of UL beams transmitted in the previous slot/subframe.

As an example, when the UL beam set required for the entire UL beam refinement is $S=\{S_0, S_1, \ldots, S_5\}$, and two UL candidate beam subsets are configured as $S_0=\{S_0, S_1, S_2\}$ and $S_1=\{S_3, S_4, S_5\}$, if the BS transmits two DCIs independently, the first DCI may include SRS resource region information corresponding to $S_0$, which is one of the UL candidate beam subsets, and corresponding UL Tx beam ID mapping information. The second DCI may include only SRS resource region information corresponding to the UL candidate beam subset $S_1$ of the subsets. In this case, the UE may implicitly map the UL Tx beam corresponding to the UL candidate beam subset $S_1$ to a corresponding SRS resource region, and transmit an SRS in the corresponding SRS resource region.

Embodiment 3-2

When SRS transmission is allocated over a plurality of slots/subframes, the SRS allocation information may include UL beam information (e.g., a beam ID set, first/last beam ID, the number of beam repetitions) to be applied to each SRS port. In this case, in order to reduce the payload size of the UL beam information, the candidate set may be preconfigured through a higher layer message.

As an example, Table 14 below shows an example for SRS transmission allocation (required UL Tx beams, S={$S_0$, $S_1$, ..., $S_4$}, $N_{sym}^{SRS\_pool}$=4).

TABLE 14

| Beam set index | # of Slot/subframe | |
|---|---|---|
| | 2 | 3 |
| 1 | Slot/subframe #1 = {$s_0, s_1, s_2, s_3$}<br>Slot/subframe #2 = {$s_4, s_4, s_4, s_4$} | Slot/subframe #1 = {$s_0, s_0, s_0, s_0$}<br>Slot/subframe #2 = {$s_1, s_2, s_3, s_4$}<br>Slot/subframe #3 = {$s_4, s_4, s_4, s_4$} |
| 2 | Slot/subframe #1 = {$s_0, s_0, s_1, s_1$}<br>Slot/subframe #2 = {$s_2, s_2, s_3, s_4$} | Slot/subframe #1 = {$s_0, s_0, s_1, s_1$}<br>Slot/subframe #2 = {$s_2, s_2, s_3, s_3$}<br>Slot/subframe #3 = {$s_4, s_4, s_4, s_4$} |
| 3 | Slot/subframe #1 = {$s_0, s_0, s_0, s_1$}<br>Slot/subframe #2 = {$s_2, s_2, s_3, s_4$} | Slot/subframe #1 = {$s_0, s_0, s_1, s_1$}<br>Slot/subframe #2 = {$s_0, s_0, s_1, s_1$}<br>Slot/subframe #3 = {$s_2, s_3, s_4, s_4$} |
| 4 | Slot/subframe #1 = {$s_0, s_0, s_0, s_1$}<br>Slot/subframe #2 = {$s_2, s_3, s_4, s_5$} | Slot/subframe #1 = {$s_0, s_1, s_1, s_1$}<br>Slot/subframe #2 = {$s_2, s_3, s_3, s_3$}<br>Slot/subframe #3 = {$s_0, s_1, s_4, s_4$} |
| 5 | Slot/subframe #1 = {$s_0, s_0, s_1, s_1$}<br>Slot/subframe #2 = {$s_2, s_2, s_2, s_3$} | Slot/subframe #1 = {$s_0, s_1, s_1, s_1$}<br>Slot/subframe #2 = {$s_3, s_3, s_3, s_3$}<br>Slot/subframe #3 = {$s_0, s_1, s_2, s_4$} |
| 6 | Slot/subframe #1 = {$s_0, s_0, s_0, s_0$}<br>Slot/subframe #2 = {$s_1, s_2, s_3, s_4$} | Slot/subframe #1 = {$s_0, s_1, s_2, s_3$}<br>Slot/subframe #2 = {$s_4, s_0, s_1, s_2$}<br>Slot/subframe #3 = {$s_3, s_4, s_0, s_1$} |

In Table 14, when the BS indicates to the UE that the index of the number of slots/subframes is 2 and the beam set index is 2 through the DCI, it indicates that {$S_0, S_0, S_1, S_1$} is mapped to SRS resources in the first slot or subframe and UE Tx beams {$S_2, S_2, S_3, S_4$} are mapped to SRS resources in the second slot or subframe for UL beam sweeping/refinement.

Embodiment 3-3

In Embodiment 3, the maximum number of UL beams to be transmitted within one slot/subframe may be determined by the number TXU of Tx RF chains of the UE. For example, when the number of RF chains is 2, the UE may transmit two beams simultaneously. Multiplexing between SRS ports/resources (or SRS resource configuration) for transmitting a plurality of beams within a slot/subframe may also be determined or limited by the number TXU of Tx RF chains of the UE.

Figure 17:
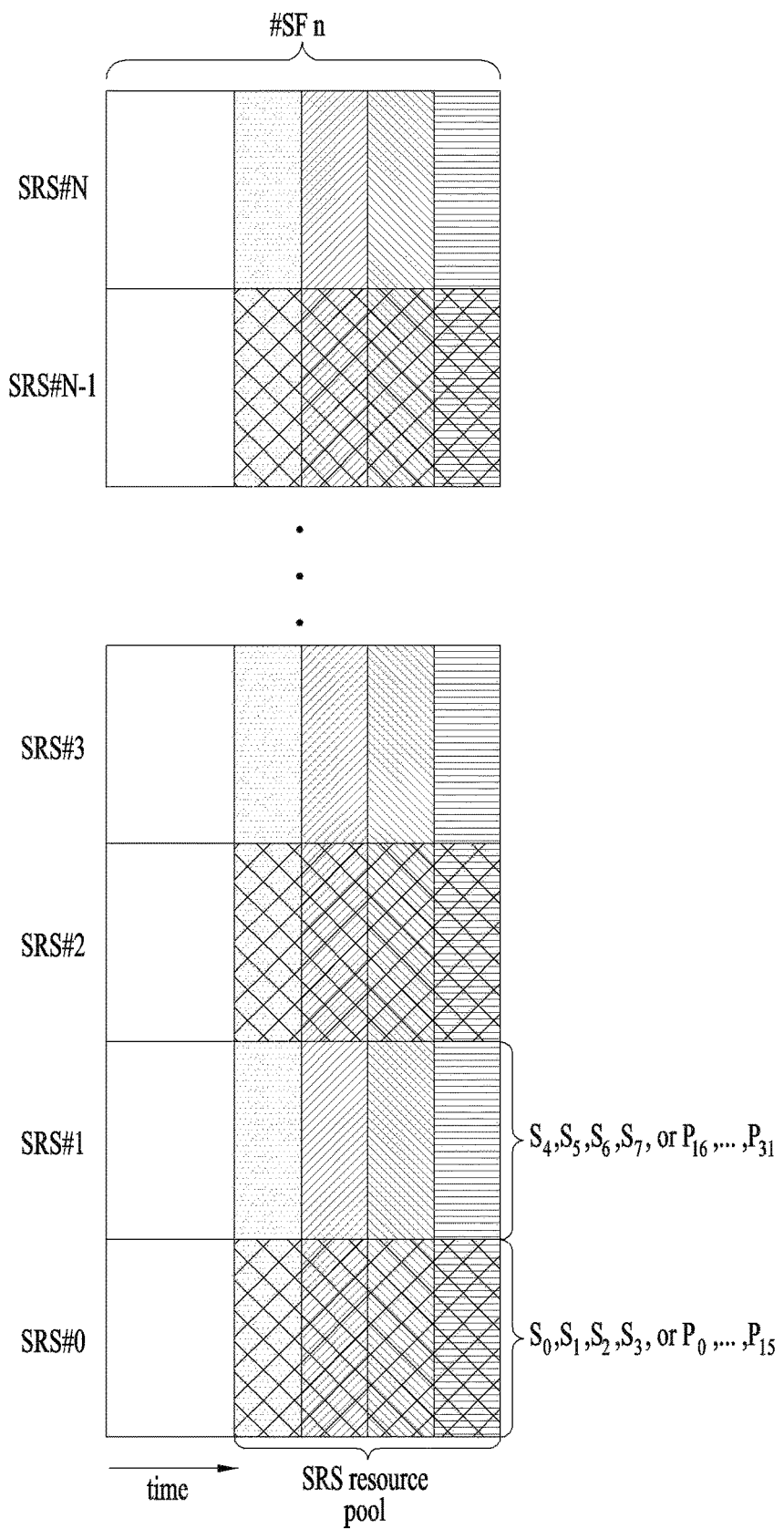
FIG. 17 is a diagram illustrating mapping between multiple SRSs and Tx beams or ports of a UE.

FIG. 17 is a diagram illustrating mapping between multiple SRSs and Tx beams or ports of a UE.

As an example, when the number of RF chains of a specific UE is 2, the number of beams that can be simultaneously transmitted on one symbol may be 2. When the number of ports capable of transmission per beam is 4, a total of 8 ports may perform simultaneous transmission. When the number of SRS symbols in one slot or subframe is 4, the SRS may be transmitted through 32 ports. If the number of candidate ports required for UL beam refinement is 32 (8 UE Tx beams) for a specific UE, SRS transmission is not allocated over a plurality of slots/subframes, but SRS resources are divided as shown in FIG. 17 and configured such that different beams or ports can be mapped thereto. Then, the divided resources are indicated to the UE. As an example, When one or more of the SRS short sequences of SRS #k is defined in a resource unit in which one or more RBs are mapped, beams or ports are mapped to odd-numbered resources SRS #1, 3, ... (on the basis of one or more RBs), and beams or ports different from the beams or ports mapped to the odd-numbered resources are mapped to even-numbered resources SRS #0, 2, ... Here, $\hat{M}$=8 and $N_{sym}^{SRS\_pool}$=4. The BS may arrange the SRS resources, as shown in FIG. 17, and indicate, to the UE, that the resources are configured according to the ports or beams.

Figure 18:
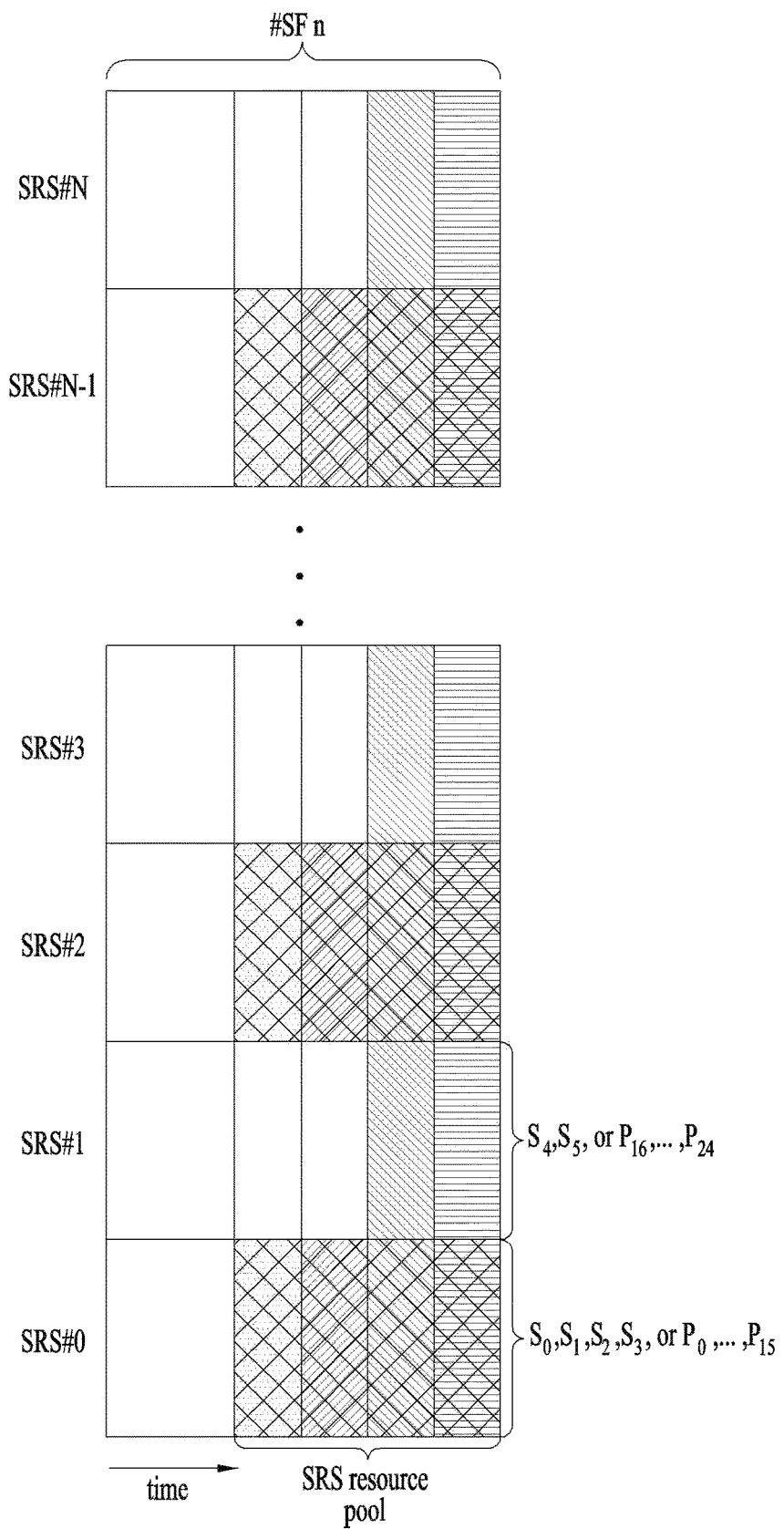
FIG. 18 is a diagram illustrating mapping between multiple SRSs and Tx beams or ports of the UE (including an UL data transmission enabled region in an SRS resource pool).

FIG. 18 is a diagram illustrating mapping between multiple SRSs and Tx beams or ports of the UE (including an UL data transmission enabled region in an SRS resource pool).

As an example, when $\hat{M}$=6 and $N_{sym}^{SRS\_pool}$=4 for a specific UE, and the number of RF chains is 2, the UE may use a resource region not used for UL beam refinement as a UL data region.

Embodiment 3-4

UL beam refinement over one or more slots/subframes may be indicated by a message requesting the UL beam refinement. That is, when the BS indicates UL beam refinement, it may announce the number of slots/subframes for the UL beam refinement or include the maximum number of Tx beams or SRS ports of the UE in the UL beam refinement request message. The UE may determine whether to transmit the SRS in one slot/subframe or in a plurality of slots/subframes based on the UL beam refinement request message.

As an example, when a BS sets the number of beams for UL beam sweeping/refinement to 20 and informs a specific of the same or indicates 40 to the UE as the number of ports, if the number of simultaneous Tx beams is 2 or the number of simultaneous transmission ports is 4 for the specific UE in terms of beamforming capability of the specific UE, and $N_{sym}^{SRS\_pool}$=8, the number of slots/subframes for UL beam refinement may be set to $$\left\lceil \frac{20}{8 \times 2} \right\rceil = 2.$$

Or when calculated in terms of ports, it may be set to $$\left\lceil \frac{40}{8 \times 2 \times 2} \right\rceil = 2.$$

The BS requests or indicates the number of slots/subframes for UL beam refinement, 2, to the UE. The UE may sequentially map the UL Tx beams to the slot/subframes including the SRS and allocated for the UL beam refinement and transmit the SRS in the slot/subframes.

Embodiment 4

When the total number (M) of UL beams to be transmitted for the UL beam sweeping/refinement operation or the number of required SRS beams ($\Sigma P_i$) exceeds the maximum number ($N_{sym}^{SRS\_pool}$) of transmittable SRS beams or the number of ports one slot/subframe (i.e., $N_{sym}^{SRS\_pool} < M$, $P_{total}^{SRS\_pool} < \Sigma P_i$) the UE may transmit, to the BS, a message requesting UL Tx beam refinement over a plurality of slots/subframes (or a message requesting transmission of an SRS over a plurality of slots/subframes for UL Tx beam refinement). In this case, the UL Tx beam refinement request message may be piggybacked on a physical uplink shared channel (PUSCH) and transmitted, or may be transmitted on a physical uplink control channel (PUCCH). In the case where the UL Tx beam refinement request message is to be transmitted on the PUCCH, the UL Tx beam refinement request message may be transmitted only in a PUCCH format having a size enabling transmission of the UL Tx beam refinement request message.

The UL Tx beam refinement request message over a plurality of slots/subframes has the following configuration.

UL Tx beam refinement request information over a plurality of slots/subframes: d(0)

As an example, 1 bit for enabling UL Tx beam refinement over a plurality of slots/subframes may be transmitted in an SR form, as shown in Equation 1.

$$y^{(p)}(n) = \frac{1}{\sqrt{P}} d(0) \cdot r_{u,v}^{(p)}(n), \; d(0) = \begin{cases} 0, & \text{enable} \\ 1, & \text{disable} \end{cases} \quad \text{Equation 1}$$

As another example, as shown in Equation 2, the UL data SR and the UL beam refinement over a plurality of slots/subframes may be distinguished from each other in a transmission format using PUCCH format 1.

$$d(0) = \begin{cases} -1, & \text{UL\_data\_SR} \\ 1, & \text{multiple\_UL\_beam\_refinement} \end{cases} \quad \text{Equation 2}$$

Embodiment 4-1

Configuration of the UL beam refinement request message over a plurality of slots/subframes may be as follows (wherein the UE transmits the message to the BS).

(1) UL Beam Refinement Request Information

Information on the necessity of performing UL beam refinement over a plurality of slots/subframes and information on the number of slots/subframes required for UL beam refinement may be included in the UL beam refinement request information.

(2) Number of UL Tx Beams or SRS Ports Required for UL Beam Refinement

The information on the number of UL Tx beams or the number of SRS ports required for UL beam refinement may be replaced with UE beamforming capability information. Alternatively, the UE may determine and report the number of UL Tx beams required in a corresponding channel state using the UL channel reciprocity.

The information on the number of UL Tx beams or the number of SRS ports required for UL beam refinement may be replaced with information on the number of UL Tx beam subsets or the number of SRS port subsets to be transmitted in each slot/subframe, or may include the information on the number of UL Tx beam subsets or the number of SRS port subsets.

The number of beam subsets required for UL beam refinement may be defined as $\bar{N}_s$, the number of required SRS port subsets may be defined as $\bar{N}_p$, the UL Tx beam set of a candidate Tx beam subset of a UE with index m may be defined as $\bar{S}_m = \{S_{a_0}, \ldots, S_{a_\alpha}\}$, and the UL Tx port set of an SRS port subset with index m may be defined as $\bar{P}_m = \{P_{a_0}, \ldots, P_{a_\alpha}\}$. Here, $\bar{N}_{S_m}$ may be defined as the number of candidate beams in $\bar{S}_m$, and $\bar{N}_{P_m}$ may be defined as the number of candidate ports in $\bar{P}_m$. The UE reports the information on $\bar{N}_s$, $\bar{N}_p$, $\bar{N}_{S_m}$, and $\bar{N}_{P_m}$ to the BS. The information may be mapped to one SRS resource pool or a plurality of SRS resource pools according to the beamforming capability of the UE. When the BS configures the SRS through one SRS slot/subframe, the BS calculates the maximum number of transmittable UE Tx beams or ports of the UE in one SRS slot/subframe considering the beamforming capability of the UE. If $\bar{N}_s$, $\bar{N}_p$, $\bar{N}_{S_m}$, or $\bar{N}_{P_m}$, reported by the UE is less than the calculated maximum number of Tx beams or ports of the UE, the BS indicates a configuration for SRS arrangement to the UE as a possible configuration as in Embodiment 3-3.

When the BS configures an SRS over two or more SRS slots/subframes, $\bar{N}_s$, $\bar{N}_p$, $\bar{N}_{S_m}$, and $\bar{N}_{P_m}$ reported by the UE may be greater than the maximum number of transmittable UE Tx beams or ports in one SRS slot/subframe according to the beamforming capability of the UE, or the BS may indicate a configuration for the SRS arrangement to the UE according to the determination of the BS.

Figure 19:
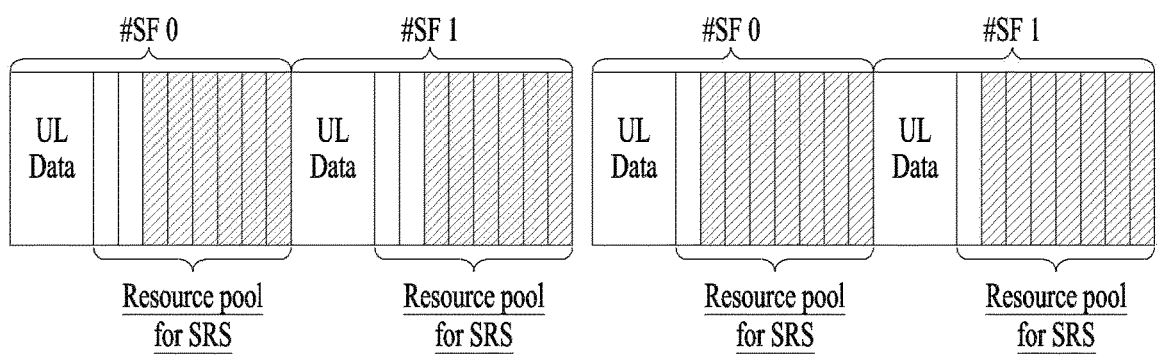
FIG. 19 illustrates transmission of multiple SRSs for multiple UL Tx beam refinements. In the illustrated example, SRS transmission is configured over two subframes.

FIG. 19 illustrates transmission of multiple SRSs for multiple UL Tx beam refinements. In the illustrated example, SRS transmission is configured over two subframes.

If the UE determines $\hat{M}=14$ and the candidate UE Tx beam ID set $S=\{s_0, s_1, s_{13}\}$ and receive $N_{sym}^{SRS\_pool}=8$ from the BS, the UE may report $\bar{N}_s=2$ to the BS (wherein $\bar{N}_s$ may be given differently according to the UE). Then, the BS may classify the candidate UE Tx beam ID set S (S=$\{s_0, s_1, \ldots, s_{13}\}$) for $\bar{N}s=2$ into $S_0$ and $S_1$ or classify the candidate UE Tx port set P into $P_0$ and $P_1$, and instruct the UE to configure SRS allocation such that the number of beams in each candidate UE Tx beam subset becomes $N_{s_0}=8$ and $N_{s_2}=6$ as in the example of sequential arrangement shown in FIG. 19(a). Alternatively, considering even arrangement as in the example of even arrangement shown in FIG. 19(b), the BS may instruct the UE to configure SRS allocation such that $N_{s_0}=7$ and $N_{s_1}=7$.

The instruction message for instructing the SRS configuration may include information indicating sequential arrangement as or information $S=\{s_0, s_1, \ldots, s_7\}$, $\{s_8, s_9, \ldots, s_{13}\}$ or information for configuration in which the SRS pool resource region is not completely filled but is divided into the same number of SRSs in the regions for two UL beam refinements (i.e., $S=\{s_0, s_1, \ldots, s_{63}\}$, $\{s_7, s_9, \ldots, s_{13}\}$. Alternatively, the BS may instruct the UE using the table in Embodiment 3-2.

If the number of transmission enabled ports in one SRS symbol is 4, the configuration may be given as $N_{P_0}=32$, $N_{P_1}=24$ or $N_{P_0}=N_{P_1}=28$, and transmission may be performed according to the above embodiment.

Embodiment 4-1-1

As a specific embodiment of Embodiment 4-1, a mapping method for multiple SRS subframes for one shot triggered UL Tx beam refinement may be indicated to the UE by the BS on the basis of slot/subframe #n in which the UL Tx beam refinement is currently being performed.

Figure 20:
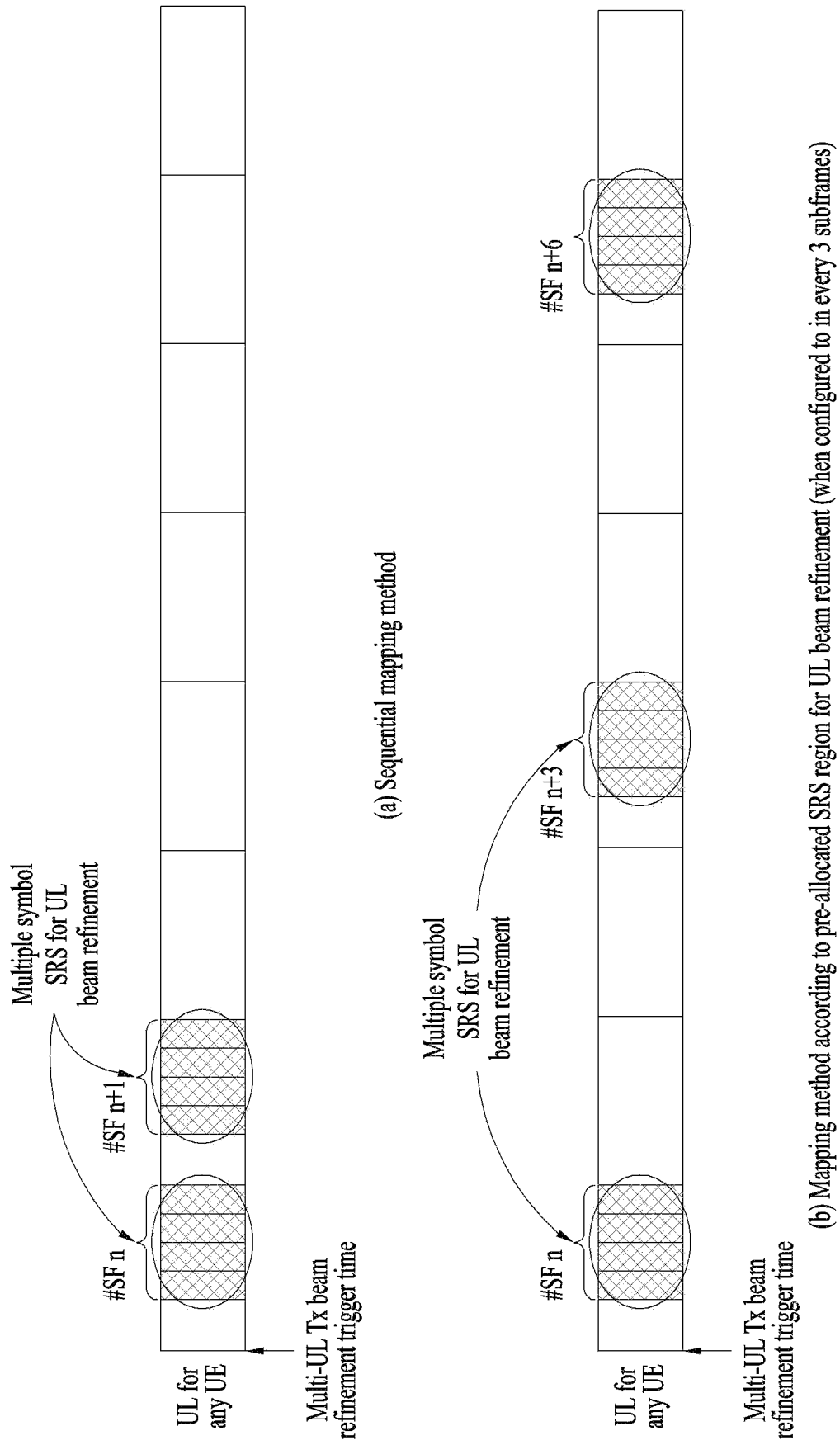
FIG. 20 is a diagram illustrating a mapping method for multiple SRS subframes for UL Tx beam refinement.

FIG. 20 is a diagram illustrating a mapping method for multiple SRS subframes for UL Tx beam refinement.

FIG. 20 illustrates a case of $\overline{N}_s=2$. FIG. 20(a) illustrates a method of sequentially mapping multiple SRS symbols for UL beam refinement to subframes (SF #n and SF #n+1), FIG. 20(b) illustrates a method of mapping according to the pre-allocated SRS region for UL beam refinement. The example of (b) is a case where multiple SRS symbol regions for UL beam refinement are configured in for every three subframes.

Figure 21:
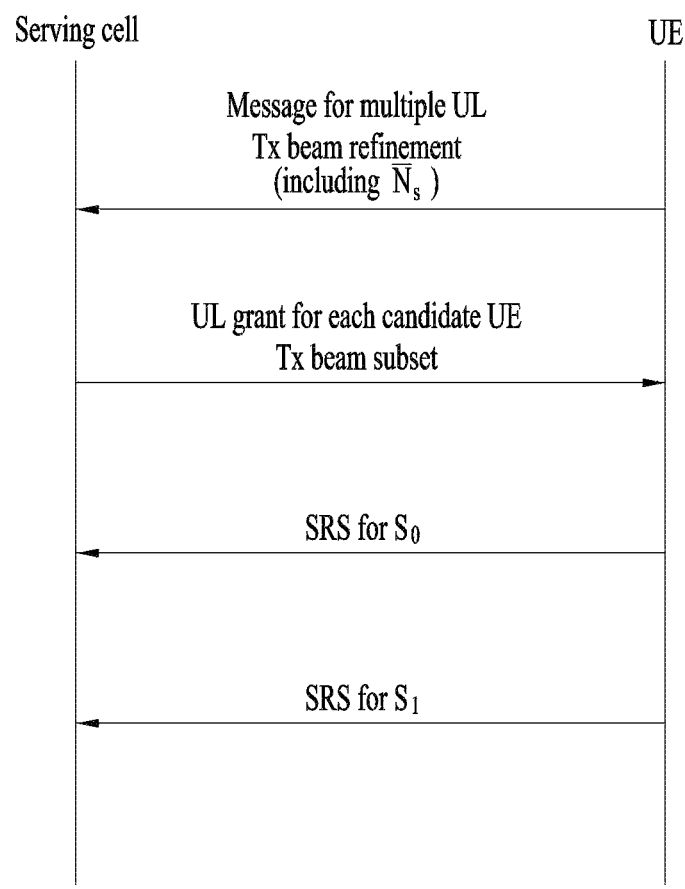
FIG. 21 is a diagram illustrating a procedure for mapping to a plurality of SRS slots/subframes.

FIG. 21 is a diagram illustrating a procedure for mapping to a plurality of SRS slots/subframes.

Referring to FIG. 21, a UE transmits a message (including $\overline{N}_s$) for multiple UL beam refinements to a BS (or a serving cell). Then, the BS may transmit information (e.g., a type of UL grant or the like) indicating each candidate Tx beam subset of the UE to the UE. For example, the UE may transmit an SRS for candidate Tx beam subset $S_0$ or an SRS for candidate Tx beam subset $S_1$, based on the information on each indicated candidate Tx beam subset.

Embodiment 4-2

A message for UL Tx beam refinement over a plurality of slots/subframes may be configured as follows (in a case where the UE transmits the UL Tx beam refinement message to the BS).

(1) UL beam refinement request information

Information on the necessity of performing UL beam refinement over a plurality of slots/subframes and information on the number of slots/subframes required for UL beam refinement may be included in the UL beam refinement request information.

(2) Number of UL Tx beams or SRS ports required for UL beam refinement

The information on the number of UL Tx beams or the number of SRS ports required for UL beam refinement may be replaced with UE beamforming capability information. Alternatively, the UE may determine and report the number of UL Tx beams required in a corresponding channel state using the UL channel reciprocity.

The information on the number of UL Tx beams or the number of SRS ports required for UL beam refinement may be replaced with information on the number of UL Tx beam subsets or the number of SRS port subsets to be transmitted in each slot/subframe, or may include the information on the number of UL Tx beam subsets or the number of SRS port subsets.

(3) A scheduling request (SR) requesting SRS resource allocation for each UL Tx beam subset may be included in the UL Tx beam refinement message.

As an example, when $\hat{M}=14$ and $N_{sym}^{SRS\_pool}=8$ are determined and the UE determines $\overline{N}_s=2$ and reports the same to the BS, if the beam subsets at this time is classified into $S_0=\{s_0, s_1, \ldots, s_7\}$, $S_1=\{s_8, s_9, \ldots, s_{13}\}$, the SR for $S_0$ may include 3 bits indicating $N_{s_0}=8$ and the 1 bit for the index referring to $S_0$. The SR for $S_1$ may include 3 bits indicating $N_{s_1}=6$ and the 1 bit for the index referring to $S^1$. The BS may transmit a message for SRS assignment for $S_0$ and $S_1$ through the same DCI or different DCIs.

Figure 22:
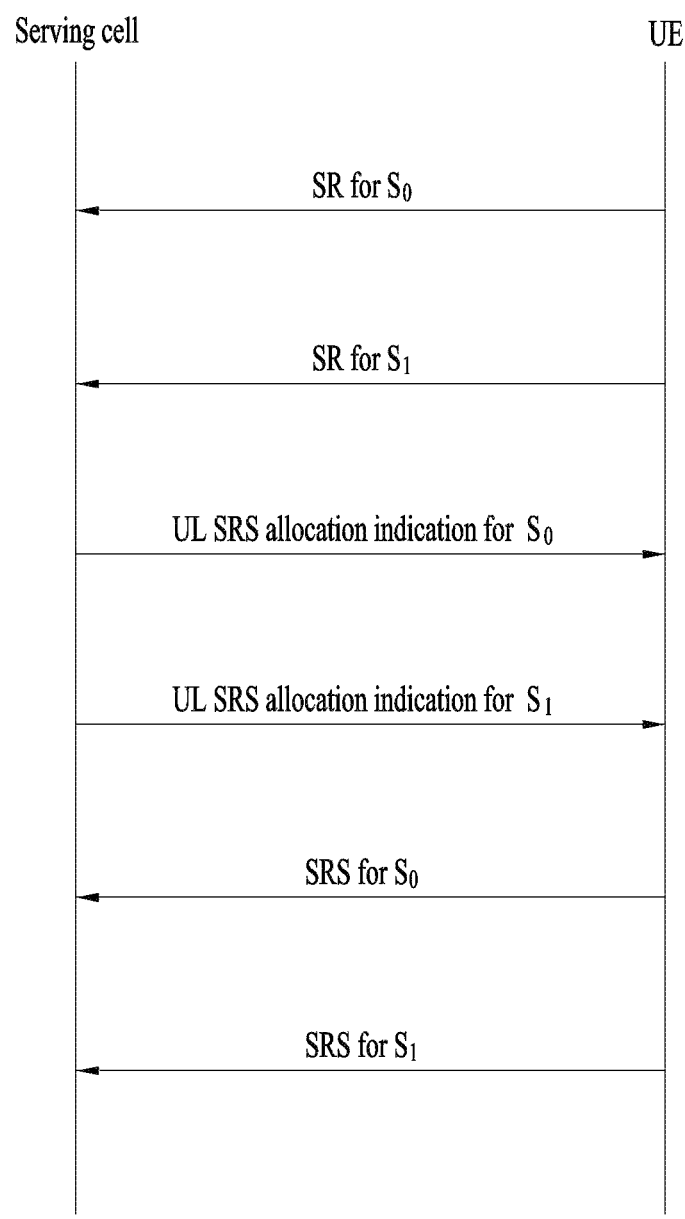
FIG. 22 illustrates a procedure of a BS transmitting SRSs for $S_0$ and $S_1$.

FIG. 22 illustrates a procedure of a BS transmitting SRSs for $S_0$ and $S_1$.

Referring to FIG. 22, once the UE transmits respective SRs for $S_0$ and $S_1$ to the BS (or serving cell), the BS may indicate, to the UE, SRS allocation (or UL SRS allocation) for $S_0$ and $S_1$ (through, for example, DCI). The UE transmits SRSs for $S_0$ and $S_1$ based on the received SRS allocation indication. Here, the SR, which is generally intended for PUSCH, is an indicator for requesting a resource for SRS transmission (S0 for the first slot and S1 for the second slot).

Embodiment 5

Upon receiving a message for transmission of a plurality of SRS slots/subframes from the UE, the BS transmits, to the UE, a message for SRS region allocation for preconfigured UL Tx beam refinement.

Embodiment 5-1

The message for SRS transmission for UL Tx beam refinement over a plurality of slots/subframes may include the following information:

(1) information on the SRS transmission subframe index for each UE Tx beam subset; and (2) information on the SRS transmission location for each UE Tx beam subset.

FIG. 23 is a diagram illustrating a message transmission method for a UE Tx beam subset over a plurality of slots/subframes.

In FIG. 23, part (a) illustrates a message transmission method for UE Tx beam subsets, and part (b) illustrates transmission of a message for each UE Tx beam subset.

Referring to (a) of FIG. 23, a BS (or a serving cell) transmits a request (or demand) message for SRS allocation over a plurality of slots/subframes to a UE. The UE may transmit an SRS for each of Sk according to the request (or demand) message for SRS allocation over a plurality of slots/subframes. The same method may be used in Embodiment 5-1 and FIG. 23 even in term of ports.

Embodiment 6

In indicating UL beam refinement, the BS may configure a DCI format having a fixed payload for UL Tx beam information over one or more slots/subframes in consideration of a fixed DCI, and the related beam information may have a fixed length (e.g., length K).

As an example, Table 15 below shows configuration of conventional LTE Release 8 DCI format 0 of the DCI, and Table 16 below shows an example of configuration of a new DCI format having a payload as the number of bits added in Table 15.

TABLE 15

| Field Name | Flag for format0/format1A differentiation | Hopping flag | N_ULhop | Resource Block assignment | MCS and RV | NDI(New Data Indicator) | TPC for PUSCH | Cyclic shift for DMRS | UL index (TDD only) | Downlink Assignment Index(D A1) | CQI request |
|---|---|---|---|---|---|---|---|---|---|---|---|
| Length | 1 | 1 | 1(1.4 MHz)<br>1(3 MHz)<br>1(5 MHz)<br>2(10 MHz)<br>2(15 MHz)<br>2(20 MHz) | 5(1.4 MHz)<br>7(3 MHz)<br>7(5 MHz)<br>11(10 MHz)<br>12(MHz)<br>13(MHz) | 5 | 1 | 2 | 3 | 2 | 2 | 1 |

TABLE 16

| Field Name | Flag for UL beam refinement | Number of Candidate UL Tx beam IDs | Candidate UL Tx beam IDs |
|---|---|---|---|
| Length | 1 | 2 | 32 (if 8 bits require per a beam) |

In Table 16, the flag for UL beam refinement field is a flag indicating whether to perform UL Tx beam refinement in the DCI format presented in the embodiment, and a DCI format that directly provides four UE beams is shown as an example.

Embodiment 6-1

The BS may include a TRP Rx beam ID in the UL Tx beam information in the payload of the fixed DCI. As a method of acquiring a UE Tx beam ID of the BS, the BS may acquire an estimated UE Tx beam ID corresponding to an estimated reception vector after receiving a UL non-precoded SRS, or may acquire the UE Tx beam ID corresponding to a precoded SRS after receiving the SRS.

As an example, information on the number of bits added in the DCI format may be as shown in Table 17 below.

TABLE 17

| Field Name | Flag for UL beam refinement | Number of Candidate UL Tx beam IDs | Candidate TRP Rx beam IDs |
|---|---|---|---|
| Length | 1 | 2 | 32 (if 8 bits require per a beam) |

Embodiment 6-2

Beam mapping with the SRS resources for UL beam sweeping/refinement may be performed for K neighboring UE Tx beam ID including a UE Tx beam ID having the best receive power or K neighboring TRP Rx beam IDs including a TRP Rx beam ID having the best receive power in the beam number information allowed in the DCI payload.

Embodiment 7

The operation of a BS for configuration for UL beam refinement for a plurality of slots/subframes is as follows.

Figure 24:
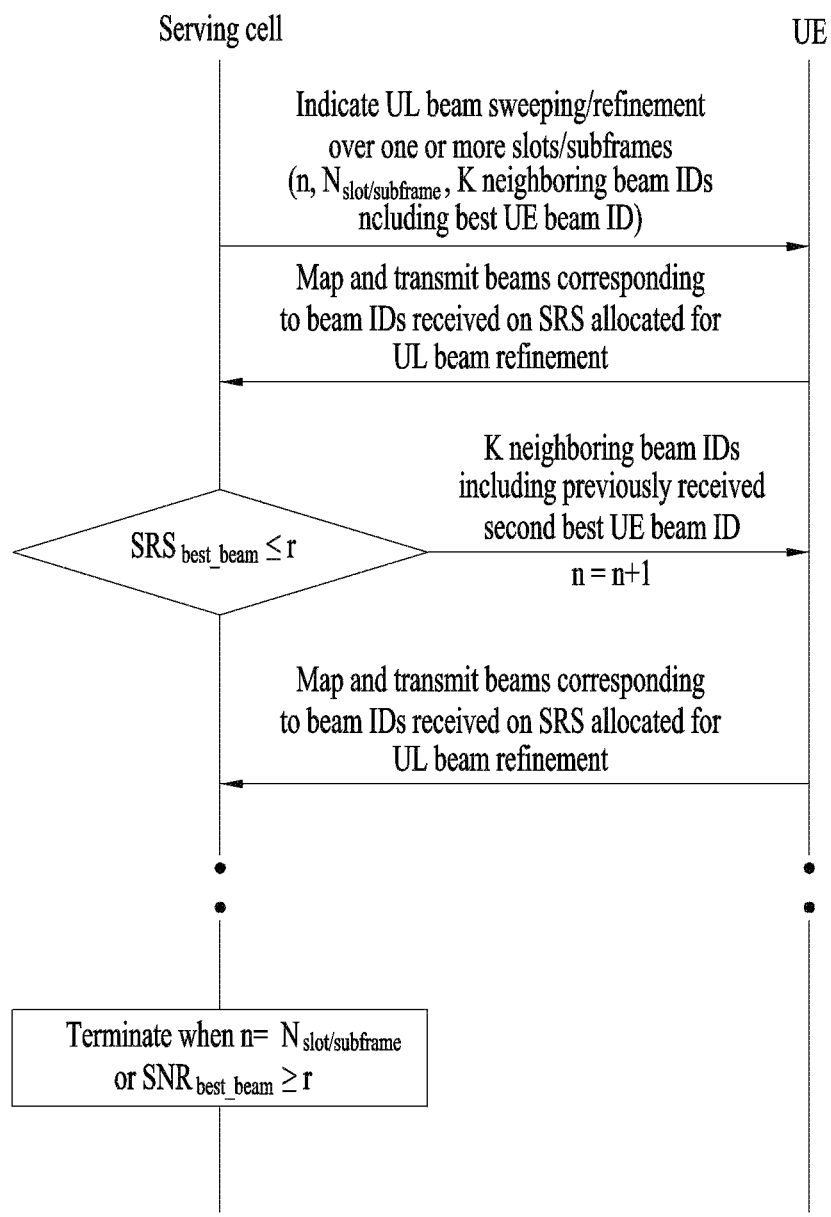
FIG. 24 illustrates an operation of a BS for configuration for UL beam refinement for a plurality of slots/subframes.

FIG. 24 illustrates an operation of a BS for configuration for UL beam refinement for a plurality of slots/subframes.

Referring to FIG. 24, a BS (or serving cell) may indicate, to the UE, UL beam sweeping/refinement over one or more slots/subframes. In this case, the message for this indication may include information on the number of slots/subframes for UL beam refinement (slot/subframe and information on the IDs of the best UE Tx beam and K neighboring beams thereof for beam information transmission in the fixed DCI. The UE may map, to corresponding SRSs, the best UE Tx beam and neighboring beams received for one slot/subframe allocated for UL beam refinement based on $N^{slot/subframe}$ and transmit the SRSs.

The BS performs UL beam refinement on one slot/subframe. When the Signal to Noise Ratio (SNR) of a beam having the best SNR among the beams received for the UL Tx beam is less than a specific reference value (such as a value corresponding to the lowest MCS), the BS may increment the counter n (where n=1, ..., $N_{slot/subframe}$) and transmit new fixed DCI containing beam information including IDs of the next best UE Tx beam and K neighboring beams thereof with respect to the previously transmitted best beam. If n=$N_{slot/subframe}$, the UL beam refinement may be terminated or initialization is performed to indicate the UL beam refinement again. When the SNR of the beam having the best SNR among the received beams is greater than a specific reference value, the counter n is initialized and the UL beam refinement is terminated.

The UE may transmit a signal by mapping the beams corresponding to the beam IDs received on the SRS allocated for the UL beam refinement.

In the method of FIG. 24, UL beam refinement is indicated using a consistent DCI format for one or more slots/subframes for a specific period. Thus, the UE may perform transmission not for all the Tx beams but for specific candidate beams to ensure efficient UL beam refinement.

Embodiment 8

A method of UL Tx beam mapping over a plurality of slots/subframes may be repeated for a specific period to perform beam refinement based on a long term. Beam mapping is possible for two kinds of repetition, and beam mapping with a combination of the two kinds may also be considered.

(1) Beam repetition on symbol level

The information that the BS should provide to the UE may include the number of slots/subframes for UL beam refinement, $N_{slot/subframe}$, the number of beam repetitions, $N_{slot/subframe}^{B\_rep}$, and the UE Tx beam IDs to be repeated.

(2) Beam order repetition on slot/subframe level

The information that the BS should provide to the UE may include $N_{slot/subframe}$, the number of beam order repetitions, $N_{slot/subframe}^{B\_rep}$, and the UE beam IDs according to the beam order.

In order to perform the beam repetition mapping operation on the symbol level, the BS may transmit, to the UE, a UL beam refinement request message including the number of repetitions and control information related to whether to perform symbol level repetition. In order to perform the beam order repetition mapping operation on the slot/subframe level, the BS may transmit, to the UE, a UL beam refinement request message including the number of repetitions and control information related to whether to perform beam order repetition mapping.

FIG. 25 is a diagram illustrating an example of beam mapping for long term beam measurement.

In an embodiment, as an example of beam repetition mapping on a symbol level, when $N_{slot/subframe}$ is 2, the number of beam repetitions $N_{B\_rep}$ is 4, is 8, and UE beam IDs are 0, 1, 2, and 3 when the BS transmits an UL beam refinement request message to the UE, the UE may perform beam mapping related to SRSs over a plurality of slots/subframes as shown in FIG. 25(a).

In another embodiment, when $N_{slot/subframe}$ is 2, the number of beam order repetitions $N_{slot/subframe}^{B\_rep}$ is set to 2, $N_{sym}^{SRS\_pool}$ is 8, and UE beam IDs are 0, 1, 2, and 3, the UE may perform beam mapping related to SRSs over a plurality of slots/subframes as shown in FIG. 25(b).

In another embodiment, when $N_{slot/subframe}$ is 2, the number of beam repetitions $N_{B\_rep}$ is 2, the number of beam order repetitions $N_{slot/subframe}$ is set to 2, $N_{sym}^{SRS\_pool}$ is 8, and UE beam IDs are 0, 1, 2, and 3, the UE may perform beam mapping related to SRSs over a plurality of slots/subframes as shown in FIG. 25(c).

As discussed above, when the number of candidate beam sets or ports for UE Tx beam refinement is greater than the number of Tx beams or ports that can be transmitted in the SRS resource region in one SRS subframe, a method for configuration allowing a plurality of slots/subframes to be used for the transmission or a method for configuration in which resources divided in one SRS subframe according to the RF capability of the UE are used and the remaining Tx beams or ports of the UE can be matched therewith is used as a configuration for the transmission as described above.

Figure 26:
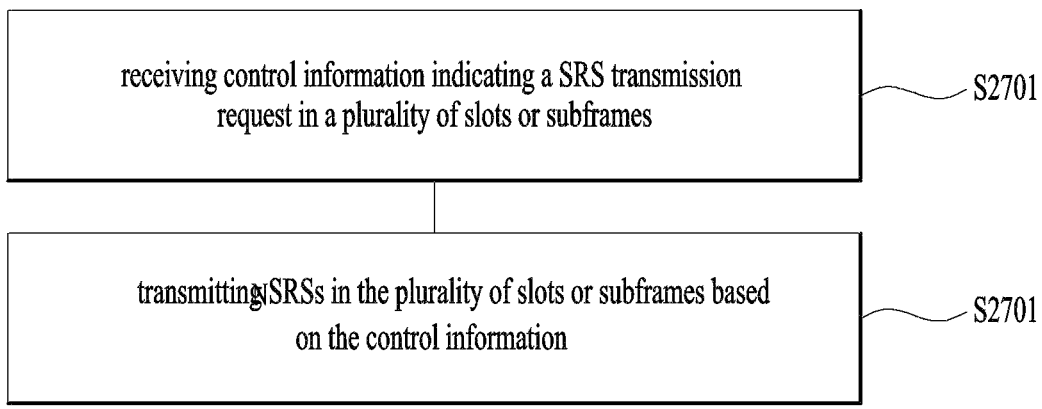
FIG. 26 shows an example of transmitting a sounding reference symbol (SRS) by a user equipment (UE) according to the present disclosure.

FIG. 26 shows an example of transmitting a sounding reference symbol (SRS) by a user equipment (UE) according to the present disclosure.

Referring to FIG. 26, at S2601, the UE may receive, from a base station, control information indicating a SRS transmission request in a plurality of slots or subframes. Especially, the control information is received when a total number of uplink transmission beams exceeds the maximum number of SRS beams transmittable in one slot or one subframe or the number of ports for SRS transmission exceeds the maximum number of ports for the SRS transmission in one slot or one subframe.

Next, at S2601, the UE may transmit SRSs in the plurality of slots or subframes based on the control information.

Figure 27:
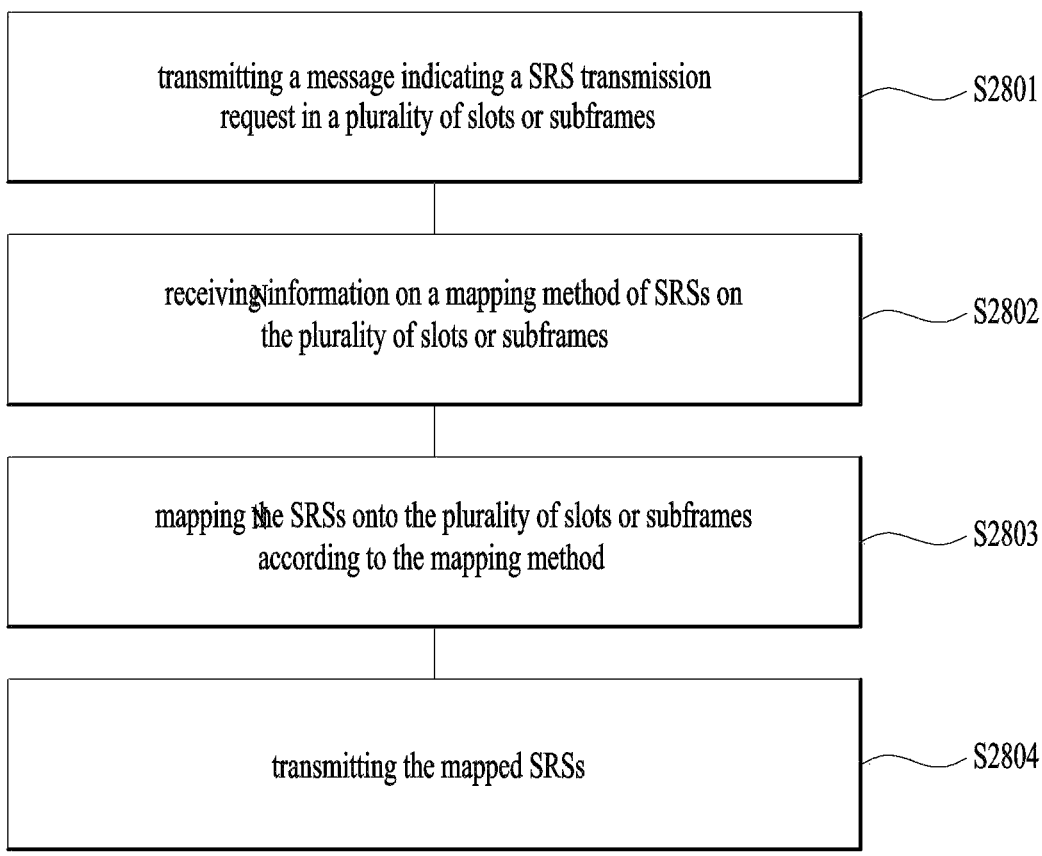
FIG. 27 shows another example of transmitting a sounding reference symbol (SRS) by a user equipment (UE) according to the present disclosure.

FIG. 27 shows another example of transmitting a sounding reference symbol (SRS) by a user equipment (UE) according to the present disclosure.

Referring to FIG. 27, at S2701, the UE may transmit, to a base station, a message indicating a SRS transmission request in a plurality of slots or subframes when a total number of uplink transmission beams exceeds a maximum number of SRS beams transmittable in one slot or one subframe or the number of ports for SRS transmission exceeds a maximum number of ports for the SRS transmission in one slot or one subframe.

Next, at S2702, the UE may receive information on a mapping method of SRSs on the plurality of slots or subframes from the base station. Then, the UE may mapping the SRSs onto the plurality of slots or subframes according to the mapping method at S2703, and may transmit the mapped SRSs to the base station at S2704.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

A data transceiving method in a wireless access system according to the present disclosure is mainly described with reference to the examples of applying to 3GPP LTE system and IEEE 802 system and may be applicable to various kinds of wireless access systems.

What is claimed is:

1. A method for transmitting a sounding reference symbol (SRS) by a user equipment (UE), the method comprising:
   receiving, from a base station, control information indicating a SRS transmission request in a plurality of slots or subframes; and
   transmitting SRSs in the plurality of slots or subframes based on the control information,
   wherein the control information is received based on (i) a total number of uplink transmission beams exceeding the maximum number of SRS beams transmittable in one slot or one subframe or (ii) the number of ports for SRS transmission exceeding the maximum number of ports for the SRS transmission in one slot or one subframe.

2. The method of claim 1, wherein the control information further comprises uplink transmission beam information for transmitting the SRSs in the plurality of slots or subframes,
   wherein the SRSs are transmitted by using uplink transmission beams included in the uplink transmission beam information.

3. The method of claim 1, wherein the control information further comprises information on the number of the plurality of slots or subframes, the number of uplink transmission beams, or the number of ports for the SRS transmission.

4. The method of claim 1, wherein the control information is for uplink beam refinement or uplink beam sweeping.

5. The method of claim 1, wherein the total number of the uplink transmission beams is determined based on the number of radio frequency (RF) chains of the UE.

6. A method for transmitting a sounding reference symbol (SRS) by a user equipment (UE), the method comprising:
 transmitting, to a base station, a message indicating a SRS transmission request in a plurality of slots or subframes, based on (i) a total number of uplink transmission beams exceeding a maximum number of SRS beams transmittable in one slot or one subframe or (ii) the number of ports for SRS transmission exceeding a maximum number of ports for the SRS transmission in one slot or one subframe;
 receiving information on a mapping method of SRSs on the plurality of slots or subframes from the base station;
 mapping the SRSs onto the plurality of slots or subframes according to the mapping method; and
 transmitting the mapped SRSs to the base station.

7. The method of claim 6, wherein the message further comprises information on the number of the plurality of slots or subframes, the number of uplink transmission beams, the number of uplink transmission beam subsets, the number of ports for the SRS transmission, or the number of port subsets for the SRS transmission.

8. The method of claim 6, wherein the message comprises a field indicating whether the message is a scheduling request (SR) for uplink data or a request for uplink beam refinement,
 wherein an SRS transmission request of the message is indicated by the request for the uplink beam refinement.

9. The method of claim 8, wherein the message is transmitted through format 1 of a physical uplink control channel (PUCCH).

10. The method of claim 6, wherein the message is transmitted by being piggybacked on a physical uplink shared channel (PUSCH).

11. A user equipment (UE) for transmitting a sounding reference symbol (SRS), the UE comprising:
 a receiver;
 a transmitter; and
 a processor,
 wherein the processor is configured to control the UE to:
 receive, from a base station, control information indicating a SRS transmission request in a plurality of slots or subframes; and
 transmit SRSs in the plurality of slots or subframes based on the control information,
 wherein the control information is received based on (i) a total number of uplink transmission beams exceeding the maximum number of SRS beams transmittable in one slot or one subframe or (ii) the number of ports for SRS transmission exceeding the maximum number of ports for the SRS transmission in one slot or one subframe.

12. The UE of claim 11, wherein the control information further comprises uplink transmission beam information for transmitting the SRSs in the plurality of slots or subframes,
 wherein the processor is further configured to control the UE to transmit the SRSs by using uplink transmission beams included in the uplink transmission beam information.

13. A user equipment (UE) for transmitting a sounding reference symbol (SRS), the UE comprising:
 a receiver;
 a transmitter; and
 a processor,
 wherein the processor is configured to control the UE to:
 transmit, to a base station, a message indicating a SRS transmission request in a plurality of slots or subframes, based on (i) a total number of uplink transmission beams exceeding a maximum number of SRS beams transmittable in one slot or one subframe or (ii) the number of ports for SRS transmission exceeding a maximum number of ports for the SRS transmission in one slot or one subframe;
 receive information on a mapping method of SRSs on the plurality of slots or subframes from the base station;
 map the SRSs onto the plurality of slots or subframes according to the mapping method; and
 transmit the mapped SRSs to the base station.

14. The UE of claim 13, wherein the message further comprises information on the number of the plurality of slots or subframes, the number of uplink transmission beams, the number of uplink transmission beam subsets, the number of ports for the SRS transmission, or the number of port subsets for the SRS transmission.

15. The UE of claim 13, wherein the message is transmitted in format 1 of a physical uplink control channel (PUCCH) or by being piggybacked on a physical uplink shared channel (PUSCH).

\* \* \* \* \*